United States Patent [19]
Shioya

[11] Patent Number: 5,875,953
[45] Date of Patent: Mar. 2, 1999

[54] METHOD AND APPARATUS FOR EFFECTING INTERFERENCE FIT OF TWO PARTS BY ACCELERATING THE PART OR PARTS

[75] Inventor: Shigemi Shioya, Okazaki, Japan

[73] Assignee: Toyota Jidosha Kabushiki Kaisha, Japan

[21] Appl. No.: 670,743

[22] Filed: Jun. 21, 1996

[30] Foreign Application Priority Data

Jun. 23, 1995 [JP] Japan ................................... 7-158190
Jun. 6, 1996 [JP] Japan ................................... 8-168496

[51] Int. Cl.[6] ............................. F16B 11/00; B23K 20/06
[52] U.S. Cl. ......................... 228/112.1; 29/525; 29/451; 29/700; 29/235
[58] Field of Search ................................... 29/525, 432.2, 29/451, 700, 235; 228/112.1, 113

[56] References Cited

U.S. PATENT DOCUMENTS

| 2,895,215 | 7/1959 | Neher et al. ............................... 29/235 |
| 3,334,510 | 8/1967 | Hallesy ....................................... 72/407 |
| 3,842,483 | 10/1974 | Cramer ...................................... 29/450 |
| 4,886,392 | 12/1989 | Iio .......................................... 29/525 X |
| 5,348,210 | 9/1994 | Linzell ................................... 29/525 X |
| 5,474,226 | 12/1995 | Joseph ................................. 228/112.1 |

FOREIGN PATENT DOCUMENTS

| 863936 | 5/1978 | Belgium . |
| 0 270 324 | 6/1988 | European Pat. Off. . |
| 1111102 | 2/1956 | France . |
| 63-144136 | 9/1988 | Japan . |
| 63-295129 | 12/1988 | Japan . |
| 4-146031 | 5/1992 | Japan . |
| 1171265 A | 8/1985 | U.S.S.R. . |

OTHER PUBLICATIONS

Patent Abstracts of Japan, vol. 12, No. 208, Jun. 15, 1988 (1 page).
Patent Abstracts of Japan, vol. 14, No. 335, Jul. 19, 1990 (1 page).
European Search Report dated Oct. 15, 1996 (3 pages).
Communication dated Oct. 29, 1996 (1 page).

Primary Examiner—Kenneth J. Ramsey
Attorney, Agent, or Firm—Finnegan, Henderson, Farabow, Garrett & Dunner, L.L.P.

[57] ABSTRACT

Method and apparatus for effecting an interference fit of two parts, wherein the two parts are held by a holding device such that the two parts are movable toward each other, and at least one of the two parts is accelerated by an accelerating device toward the other or each other in a direction that permits the interference fit, to give the at least one part a kinetic energy, for thereby achieving the interference fit of the two parts.

27 Claims, 10 Drawing Sheets

FUSION WELD LAYER

SERRATION

SERRATION

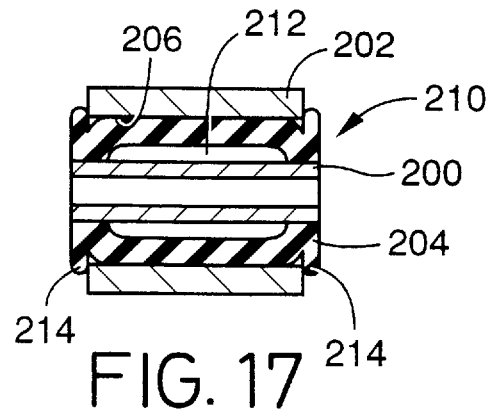
FIG. 17
FIG. 18
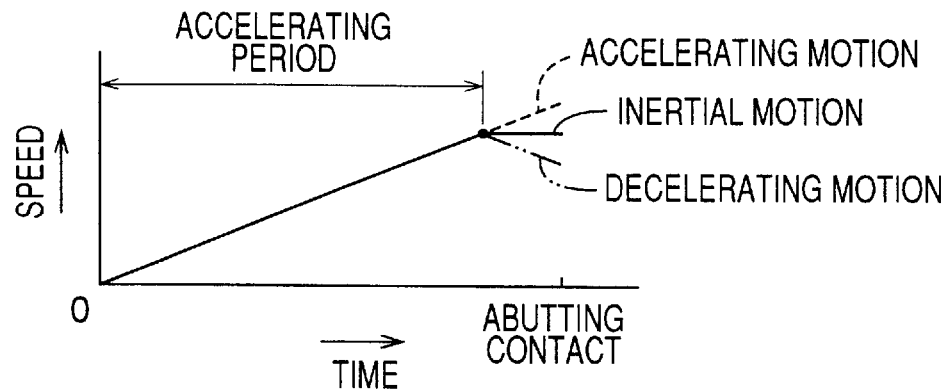
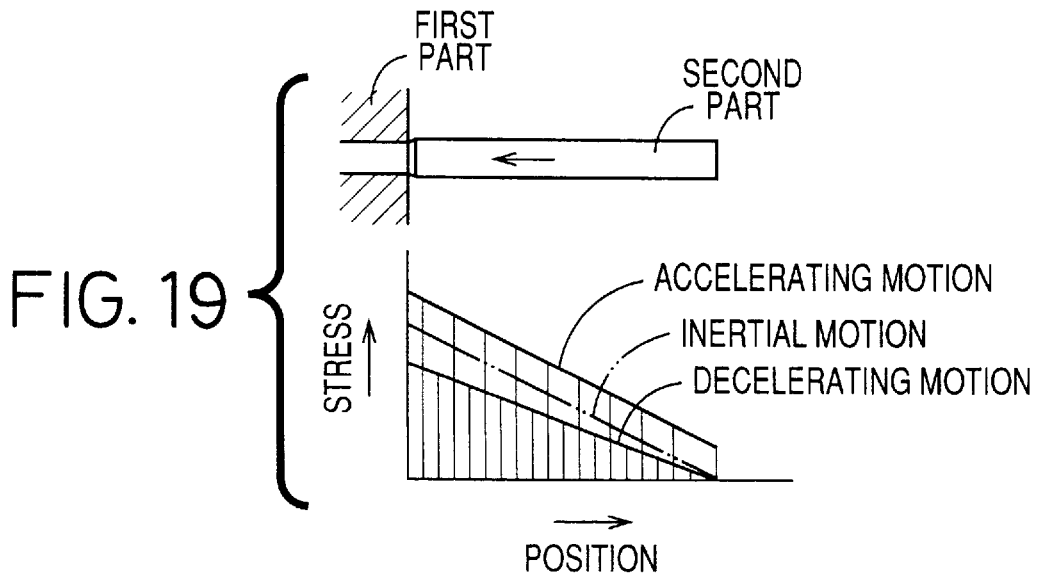
FIG. 19

METHOD AND APPARATUS FOR EFFECTING INTERFERENCE FIT OF TWO PARTS BY ACCELERATING THE PART OR PARTS

BACKGROUND OF THE INVENTION

1. Field of the Invention

The present invention relates to a method and an apparatus for effecting an interference fit of two parts, and more particularly to techniques for minimizing the amount of unnecessary deformation of the parts during an operation to effect the interference fit.

2. Discussion of the Prior Art

JP-U-63-144136 (laid-open publication of Japanese Utility Model Application NO. 62-35891) discloses conventional method and apparatus for effecting an interference fit of two mating parts of an assembly. In this conventional interference-fit method, at least one of the mating parts is forced onto the other part by a rigid pressure head, to thereby effect an interference fit for assembling the two parts. The conventional apparatus disclosed in the above publication includes (a) a first holder device for holding a first part which is one of the two parts to be assembled, (b) a second holder device for holding a second part which is the other of the two parts, such that the second part is movable toward the first part held by the first holder device, in the direction of the interference fit with the second part; and (c) a pushing device including a pressure head (equipped with a chuck if necessary) which is adapted to engage with the second part held by the second holder device and force the second part onto the first part held by the first holder device. Thus, the conventional technique for effecting an interference fit of the first and second parts uses a pressure head which directly forces the second part into the first part to achieve the interference fit of these two parts.

However, the conventional technique for effecting an interference fit suffers from the following problem.

In the case where the second part in the form of a shaft is axially forced or press-fitted into a hole axially formed through the first part, for example, this press fitting operation is possible provided only a mating portion of the second part which engages with the first part is forced in the direction of the interference fit, namely, in the axial direction of the second part. In the conventional technique indicated above, however, a mechanical force F produced by the pressure head during an press-fitting operation of the two parts is received by the second part at one of its opposite axial ends remote from the first part, as indicated in the upper part of FIG. 3. As a result, the axial force acting on the second part is evenly distributed over the entire axial length of the second part, as indicated in the lower part of FIG. 3. Consequently, the conventional technique causes a considerably large axial compressive stress acting on the portion of the second part other than the mating portion at which the interference fit is achieved.

The above phenomenon results in the following problem, where the mating portion of the second part is made of a hard material such as a steel. Usually, the axial compressive force acting on the second part during the press-fitting operation is not evenly distributed on the opposite sides of the axis of the second part, and tends to generate a moment that causes the second part to be bent with respect to its axis. Where the moment generated is large, the portion of the second part other than the mating portion press-fitted in the first part is likely to suffer from undesirable permanent deformation. If the portion of the second part other than the mating portion includes a region that can be easily bent due to a cutout or local reduction in the modulus of section, plastic deformation may take place due to stress concentration in that region, leading to permanent deformation of the second part.

The large axial compressive force acting on the portion of the second part other than the mating portion will cause the following problem, where the mating portion is made of an elastic material such as rubber. That is, the axial compressive force produced during the press-fitting operation will cause elastic deformation of the elastic portion of the second part in the direction perpendicular to the direction of the press fitting of the two parts. This elastic deformation results in an increase in the amount of interference between the elastic portion of the second part and the corresponding mating portion of the first part, whereby the press fitting is difficult to achieve, or likely to cause surface damaging or breakage of the elastic portion of the second part.

In the conventional technique for effecting an interference fit of two parts, a considerably large axial compressive force produced during the press-fitting operation unnecessarily acts on a portion of one of the two mating parts which is displaced relative to the other, so that the displaced part undesirably suffers from deformation at that portion.

Where the mating portion of the second part is made of an elastic material, that surface of this elastic portion is generally coated with a lubricant. However, when the amount of interference between the mating portions of the first and second parts is relatively large, the lubricant is wiped off by the first part, leading to an insufficient lubricating effect of the lubricant. In view of this drawback, the conventional method is adapted such that the second part is first forced into the hole of the first part by a distance larger than the nominal length of the interference fit of the two parts so as to ensure fitting of the mating portions of the two parts, and then the second part is displaced in the reverse direction so as to release the undesirable compressive stress in the elastic mating portion of the second part. Thus, the conventional method requires an extra step where the mating portion of the second part is made of an elastic material.

SUMMARY OF THE INVENTION

It is therefore an object of the present invention to provide a method of effecting an interference fit of two mating parts, without deformation of at least one of the parts which is displaced for the interference fit.

It is a second object of the invention to provide an apparatus suitable for practicing the method.

The first object may be achieved according to a first aspect of the present invention, which provides a method of effecting an interference fit of two parts, wherein at least one of the two parts is accelerated toward the other or each other in a direction that permits the interference fit, to give the at least one part a kinetic energy, for thereby achieving the interference fit of the two parts.

In the present method wherein at least one of the two parts is accelerated toward each other for press-fitting contact to achieve the interference fit, the distribution of the axial compressive stress acting on each accelerated part is different from the distribution of the axial compressive stress acting on the part which is pressed by a pressure head onto the the other part as in the conventional method as indicated in the upper part of FIG. 3. In the example of FIG. 3, the second part in the form of a rod is pressed by the pressure head, at its end opposite to its end at which the second part is forced into the bore of the other or first part. In this conventional method, the axial compressive strain acting on the second part is evenly distributed in the direction of the interference fit, as indicated in the lower part of FIG. 3. In the method of the present invention, on the other hand, the second part is accelerated to achieve the inference fit with the first part, for example, as indicated in the upper part of FIG. 4. In the present method, the axial compressive stress acting on the second part continuously decreases in the axial direction from the first part toward the second part, such that the stress is zeroed at the end of the second part remote from the first part, as indicated in the lower part of FIG. 4.

When the second part is accelerated for the interference fit with the first part as indicated in FIG. 4, the axial compressive stress in the end portion of the second part remote from the first part is considerably reduced, whereby the amount of deformation in that end portion of the second part due to the compressive stress is significantly reduced.

The method of the present invention described above was developed based on the above analysis. Where the part to be accelerated has a rigid portion for an interference fit with the other part, this part is advantageously protected against permanent deformation in the form of bending due to the axial compressive stress during the relative movement of the two parts to achieve the interference fit. Where the part to be accelerated has an elastic portion for an interference fit with the other part, the amount of deformation of the elastic portion in the direction perpendicular to the direction of the interference fit is considerably reduced, and the conventional problem of difficulty to achieve the interference fit due to this deformation is desirably eliminated.

The present method according to the first aspect of this invention will be described for further clarification thereof.

(1) The two parts may have respective rigid portions for an interference fit with each other. Alternatively, the two parts have respective rigid and elastic portions for the interference fit with each other.

(2) Where one of the two parts has a rod portion while the other part has a bore for an interference fit with the rod portion, only the part having the rod portion or only the other part having the bore may be accelerated. Alternatively, these two parts may be accelerated toward each other.

(3) The acceleration of at least one of the two parts may be accomplished by application of a fluid pressure (pressure of a gas or a liquid), a magnetic force, a gravitational force or a centrifugal force to the part or parts to be accelerated. Alternatively, the acceleration may be accomplished by application of a mechanical force directly to the part or parts to be accelerated.

(4) The method according to the first aspect of this invention may include (a) a process in which at least one of the two parts is accelerated toward the other or each other, and (b) a process in which the two parts effect abutting contact and interference fit with each other.

The accelerating process may comprise, for example, applying a pressurized fluid (gas such as air, or liquid) to the above-indicated at least one part to give a thrust force to the at least one part, without a contact of the at least one part with a mechanical member. The pressurized gas having a pressure higher than the atmospheric pressure may be delivered from a high-pressure source to the part or parts to be accelerated, through a suitable passage connected to the high-pressure source, and a control valve provided in the passage. In this case, the pressurized gas is delivered to the part or parts when the control valve is open. Alternatively, the pressurized gas may be produced by an explosive ignited by a suitable igniting device so as to cause instantaneous expansion of a gas such as air.

Alternatively, the accelerating process may be effected by utilizing the gravitational or centrifugal force acting on the part or parts. Further, the accelerating process may be effected by a magnetic attractive or repellent force acting on the part or parts.

(5) The present method may be adapted such that the above-indicated at least one part is accelerated by an externally applied force (force based on a gaseous or liquid pressure, mechanical force, magnetic force, gravitational and centrifugal force) while at the same time it is guided by a suitable guide tube or passage, and such that the acceleration is terminated so that the at least one part is moved at a substantially constant velocity before the two parts initiate a relative movement that causes the interference fit.

In a first preferred form of the method according to the first aspect of this invention, the kinetic energy is given to the above-indicated at least one part by applying a pressure of a pressurized fluid to the at least one part.

The part or parts may be accelerated by a rigid member which is adapted to apply a mechanical force directly to one of the opposite ends of the part remote from the other part. However, the application of the pressure of a pressurized fluid (pressurized gas or liquid which is more easily freely deformable than a rigid member) to the part or parts to be accelerated is desirable to prevent or reduce the deformation of the accelerated part or parts in the process of the interference fit, whereby the accelerated part is protected against damaging or scoring at its end portion remote from the other part.

To assure improved protection of the accelerated part against damaging at its end portion remote from the other part, the use of a pressurized gas as the pressurized fluid is preferred since the pressurized gas has higher degrees of compressibility and free deformability than the pressurized fluid.

The above first preferred form of the method was developed based on the above finding, and is effective to prevent the undesired deformation of the accelerated part or parts, and the undesired damaging or scoring of the same at the end portion remote from the other part.

In a second preferred form of the present method, the above-indicated at least one part is moved toward the other or each other at a substantially constant velocity after the at least one part is given the kinetic energy by acceleration thereof and before the two parts contact each other and initiate a relative movement thereof to achieve the interference fit, namely, a relative movement which causes the interference fit.

In the above second preferred form of the method, each of the above-indicated at least one part is initially accelerated. As indicated in the graph of FIG. 18, the initially accelerated part may be subsequently accelerated continuously, or moved at a substantially constant velocity, or alternatively decelerated, shortly before the two parts initiate a process of the interference fit. If the pressurized gas is continuously applied to the part until the interference fit process is initiated, for example, the interference fit process is initiated while the part is still under acceleration. If the application of the pressurized gas is terminated after a predetermined period of the acceleration, the interference fit process is initiated during movement of the part by the kinetic energy at a substantially constant velocity. If the acceleration is terminated after the predetermined accelerating period and a sliding resistance is positively applied to the initially accelerated part during movement of the part through a guide passage after the accelerating period, for example, the interference fit process is initiated during deceleration of the part in question. In these three cases, the axial compressive stress acting on the part in question due to abutting contact with the other part (in the interference fit process) is distributed as indicated in the graph of FIG. 19. In each of these cases, the axial compressive stress decreases in the direction from the above-indicated other part toward the initially accelerated part in question, whereby the axial compressive stress in the end portion of the initially accelerated part remote from the other part is considerably small as compared with that according to the conventional method in which one part is pushed at its one end by a pressure head as indicated in FIG. 3. To zero the axial compressive stress in the above-indicated end portion of the initially accelerated part, it is effective to terminate the acceleration of the initially accelerated part and initiate an inertial motion of this part before its abutting contact with the other part or before initiation of the interference fit process.

The above second preferred form of the method, which was developed on the basis of the above finding, is effective to eliminate or minimize the axial compressive stress in the end portion of the accelerated part remote from the other part, and provides an increased effect to prevent the undesired deformation of the accelerated part.

The above second preferred form of the method will be described for further clarification thereof.

(1) According to one advantageous arrangement of the above form of the method, the above-indicated at least one part is guided by a guide passage, and the acceleration of the at least one part by the kinetic energy is terminated and the at least one part is moved at a substantially constant velocity after a space formed behind each of the at least one part in the guide passage has been exposed to an ambient space after the at least one part is given the kinetic energy and before the two parts initiate the relative movement to achieve the interference fit. This arrangement permits a substantially inertial motion of the at least one part in the guide passage by exposure of the guide passage to the ambient space, even though the guide passage in which the at least one part is initially accelerated is a closed space until the guide passage is exposed to the ambient space. This arrangement may be obtained by a relatively simple mechanism.

(2) The method according to the above advantageous arrangement may include (a) a process in which at least one of the two parts is accelerated toward the other or each other, (b) a process in which the acceleration of the above-indicated one part is terminated and the at least one part is moved at a substantially constant velocity, and (c) the two parts effect abutting contact and interference fit with each other.

According to a third preferred form of the present method, the above-indicated at least one part is guided by a guide passage with a predetermined clearance therebetween, and is supported in the guide passage without a contact with an inner surface of the guide passage.

In the above third preferred form of the method in which each accelerated part is guided by and moved relative to the guide passage, the movement of the accelerated part is not disturbed by its contact with the inner surface of the guide passage, and the outer and inner surfaces of the accelerated part and the guide passage are both effectively protected against damaging.

The above third preferred form of the method will be further described.

(1) According to one advantageous arrangement of the third preferred form of the method, the above-indicated at least one part is supported in a fluid bearing state in the guide passage without the contact with the inner surface of the guide passage, with a supply of a pressurized fluid to the above-indicated clearance. The fluid used support the at least one part in the fluid bearing state may be the same as the pressurized fluid used to give the kinetic energy to the at least one part, or may be different from this pressurized fluid. However, the former arrangement does not require an additional mechanism for supporting the at least one part in the air bearing state, and is therefore more desirable.

(2) The guide passage may be formed so as to extend in the horizontal or vertical direction. Where the guide passage extends in the horizontal direction, the part in question is held by the pressurized fluid in a floating state, with its outer surface being spaced from the inner surface of the guide passage against the gravitational force. Where this floating of the part is achieved by supplying the pressurized air to the clearance between the part and the guide passage, the part in question is supported in an air bearing or floating state.

According to a fourth preferred form of the present method, a pressure increase in a space in front of each of the above-indicated at least one part during movement thereof by the kinetic energy is restricted.

In the above fourth preferred form of the method, the movement of each of the at least one part is not disturbed by the pressure in the space in front of the part in question, and the movement is effected as intended to achieve the interference fit of the two parts.

In one advantageous arrangement of the above fourth preferred form of the method, the above-indicated at least one part is guided by a guide passage, and the pressure increase is restricted by exposing the space in front of the part to an ambient space while the at least one part is moved in the guide passage and before the two parts contact each other and initiate a relative movement thereof to achieve the interference fit. This arrangement to restrict the pressure increase is relatively simple.

According to a sixth preferred form of the present method, the interference fit is achieved by a relative movement of the two parts such that contacting surfaces of the two parts are welded together by friction heat generated at the contacting surfaces during the relative movement.

Where the interference fit is achieved by the relative movement of the two parts at a given relative velocity by the kinetic energy, friction heat is generated at the contacting surfaces of the two parts during the relative movement. This friction heat can be utilized to weld together the contacting surfaces of the two parts. This welding increases the bonding strength of the interference fit.

The above fifth preferred form of the method, which was developed based on the above finding, is effective to obtain a larger bonding force at the interface of the contacting surfaces of the two parts, than the bonding force obtained by only the interference fit.

According to a sixth preferred form of the present method, a movement of the above-indicated at least one part by the kinetic energy is effected under a controlled thermal condition.

Where the kinetic energy is given to each other at least one part by applying a pressure of a pressurized gas as the pressurized fluid to the at least one part, the volume of the pressurized gas changes with its temperature. A change in the volume of the pressurized gas influences the movement of the at least one part, and the movement cannot be optimized or stabilized to achieve the intended interference fit of the two parts.

The above sixth preferred form of the method, which was developed based on the above finding, is effective to stabilize the movement of the at least one part irrespective of a change in the thermal condition in which the movement takes place.

The above sixth preferred form of the method will be described for further clarification thereof.

(1) The thermal condition may be adjusted by adjusting the temperature of a fluid which is circulated adjacent to the desired component or components through which the movement of the at least one part takes place. The temperature of the desired components is adjusted by the temperature adjustment of the fluid. Alternatively, the thermal condition may be adjusted by controlling an electric current flowing through an electrically resistive heater disposed adjacent to the desired components. In this case, the temperature of the desired components is adjusted by controlling the electric current.

(2) In one advantageous arrangement of the above sixth preferred form of the method, the kinetic energy is given to the above-indicated at least one part by applying a pressure of a pressurized gas to the at least one part, and the at least one part is guided by a guide passage, the thermal condition is adjusted such that the temperature of the pressurized gas in the guide passage is held substantially constant.

The first object indicated above may also be achieved according to a second aspect of the present invention, which provides a method of effecting an interference fit of a rigid portion of a first part and an elastic portion of a second part, wherein the second part is accelerated toward the second part and is thereby given a kinetic energy, and during a movement of the second part by the kinetic energy the elastic portion of the second part is subjected to deformation in a direction that permits an increase in an amount of clearance between the first and second part, the deformation of the elastic portion of the second part being caused by application of a pressure of a pressurized fluid higher than an atmospheric pressure to a surface of the elastic portion of the second part which mates with a corresponding surface of the rigid portion of the first part, the interference fit being achieved by engagement of the rigid and elastic portions with each other before the elastic portion is freed from the deformation.

The method according to the first aspect of this invention which has been described above may be practiced to effect an interference fit of two parts one of which has an elastic portion for the interference fit with the other part. In this case, too, the method according to the first aspect of the invention is more or less effective to reduce the amount of elastic deformation of the elastic portion of the part in the direction perpendicular to the direction of the interference fit, and therefore more or less facilitates the process of the interference fit. However, the above method which is primarily effective to reduce the axial compressive stress of the accelerated part or parts is not effective enough to sufficiently reduce the amount of elastic deformation of the elastic portion. Therefore, the above first object of this invention cannot be completely achieved when the method is practiced to achieve the interference fit of the two parts one of which has an elastic portion at which the interference fit with the other part takes place.

Where the two parts have respective rigid and elastic portions for an interference fit with each other, the interference fit can be achieved by accelerating the first part having the elastic portion, and compressing the elastic portion during the movement of the first part toward the second part having the rigid portion, to thereby cause elastic deformation of the elastic portion in the direction that permits an increase in the amount of a clearance between the rigid and elastic portions of the first and second parts, so that the interference fit is achieved by engagement of the rigid and elastic portions of the two parts before the elastic portion is freed from the deformation.

When the interference fit of the rigid and elastic portions of the two parts is achieved in the manner as described above with the compression of the elastic portion before the interference fit process is initiated, the undesired axial compressive stress which would act on the second part due to its abutting contact with the first part is minimized since the abutting contact occurs during the inertial movement of the second part, whereby the amount of reduction of the clearance due to the abutting contact is reduced. The reduction of the clearance is further reduced since the interference fit process takes place before the elastic portion of the second part is freed from the compressive deformation. Thus, the abutting contact of the second part with the first part during the movement of the second part at a substantially constant velocity by the kinetic energy, and the compressive deformation of the elastic portion of the second part cooperate to provide a synergistic effect to facilitate the process of the interference fit between the rigid and elastic portions of the two parts.

The method according to the second aspect of this invention described above was developed based on the above finding, and is effective to facilitate the process of the interference fit between the first and second parts even where the portion of the second part at which the interference fit with the first part takes place is made of an elastic material.

The method according to the second aspect of the invention will be described for further clarification thereof.

(1) The pressurized fluid may be a gas or liquid, and the pressure of the pressurized fluid may be applied directly to the surface of the elastic portion of the second part without a contact of the elastic portion with any mechanical member, or may alternatively be applied to the surface of the elastic portion via a suitable rigid member.

(2) Where one of the two parts has a rod portion and the other has a hole, the second part may have either the rod portion on which the elastic portion is formed, or the hole whose inner circumferential surface is defined by the elastic portion.

(3) In one preferred form of the method according to the third aspect of the invention, the elastic portion of the second part is a substantially cylindrical elastic portion, and the second part further has a cylindrical rigid portion which is positioned relative to the substantially cylindrical elastic portion such that the elastic portion is in contact with the rigid portion only at axially opposite ends thereof and is radially spaced apart from the rigid portion at an axially intermediate portion thereof so as to define an annular void which permits easy elastic compressive deformation of the elastic portion upon application of a compressive force to the elastic portion in its radial direction.

The second object indicated above may be achieved according to a third aspect of the present invention, which provides an apparatus for effecting an interference fit of two parts, comprising: (a) a holding device for holding the two parts such that at least one of the two parts is movable toward the other or each other in a direction that permits the interference fit; and (b) an accelerating device for accelerating the above-indicated at least one part held by the holder device, toward the other of the two parts or each other, to give the at least one part a kinetic energy, for thereby achieving the interference fit of the two parts.

In the present apparatus, the interference fit of the two parts is achieved by a relative movement of the two parts by the kinetic energy, without undesired deformation of the part or parts to be accelerated.

The apparatus of the invention will be described for further clarification thereof.

(1) According to a first preferred form of the present apparatus, the accelerating device includes (a) a high-pressure source (e.g., a reservoir or tank storing a compressed gas) storing a pressurized gas having a high pressure, (b) means for defining a guide passage for guiding the above-indicated at least one part, and (c) a control valve which is disposed between the guide passage and the high-pressure source and which has an open state for supplying the pressurized gas into the guide passage and a closed state for disconnecting the guide passage from the high-pressure source.

(2) According to a second preferred form of the apparatus, the holding device comprises a first holder device for holding one of the two parts, and a second holder device for holding the other of the two parts such that the other part is movable toward the one part held by the first holder device, and the accelerating device accelerates the other part held by the second holder device, toward the one part held by the first holder device.

(3) In the present apparatus, the above-indicated at least one part may be accelerated by a suitable external force (e.g., a force based on air pressure or hydraulic pressure, a mechanical force, a magnetic force, a gravitational force, or a centrifugal force) while it is guided by a suitable guide tube or passage, and the interference fit of the two part is achieved during relative movement of the two parts at a substantially constant velocity by the kinetic energy given by the accelerating device.

According to a third preferred form of the apparatus according to the third aspect of the invention, the accelerating device comprises means for applying a pressure of a pressurized fluid to the at least one part to give a kinetic energy to the at least one part.

The apparatus according to the above third preferred form is effective to eliminate or reduce damaging or scoring of the at least one part at the end portion remote from the interference fit portion.

According to a fourth preferred form of the apparatus of the invention, an inertial motion mechanism is further provided for terminating acceleration of the at least one part so that the at least one part is moved at a substantially constant velocity after the at least one part is given the kinetic energy by acceleration thereof and before the two parts contact each other and initiate a relative movement thereof to achieve the interference fit.

The apparatus according to the above fourth preferred form is effective to eliminate or reduce an axial compressive force which acts on the end portion of the at least one part remote from the interference fit portion.

In one advantageous arrangement of the above fourth preferred form of the apparatus, suitable means is further provided for defining a guide passage for guiding the at least one part, and the inertial motion mechanism comprises means for defining a communication hole communicating at one end thereof with an ambient space. This communication hole is located so that the communication hole is communicated at the other end thereof with a space formed behind each of the at least one part in the guide passage after the at least one part is given the kinetic energy and before the two parts initiate the relative movement to achieve the interference fit. The communication hole may be adapted such that the hole is held closed before the two parts contact each other, to permit the acceleration of the at least one part by the pressurized fluid, and such that the hole is opened to the ambient space to cause the pressurized fluid to be discharged into the ambient space when the two parts come close to each other or shortly before the two parts contact each other and initiate the process of the interference fit.

According to a fifth preferred form of the third aspect of this invention, the apparatus further comprises (a) means for defining a guide passage for guiding the at least one part with a predetermined clearance therebetween, and (b) a support mechanism for supporting the at least one part in the guide passage without a contact with an inner surface of the guide passage.

In the above form of the apparatus in which each accelerated part is guided by and moved relative to the guide passage, the movement of the accelerated part is not disturbed by its contact with the inner surface of the guide passage, and the outer and inner surfaces of the accelerated part and the guide passage are both effectively protected against damaging.

The support mechanism may be adapted to support each accelerated part in a fluid bearing state with a supply of a pressurized fluid into the clearance between the guide passage and the accelerated part.

According to a sixth preferred form of the third aspect of the invention the apparatus further comprises a pressure-increase restricting mechanism for restricting a pressure increase in a space in front of each of the at least one part during movement thereof by the kinetic energy.

In the above sixth preferred form of the apparatus, the movement of the above-indicated one part by the kinetic energy is not disturbed by the pressure increase in the space in front of the part.

In one advantageous arrangement of the above sixth preferred form of the apparatus, suitable means is further provided for defining a guide passage for guiding the at least one part, and the pressure-increase restricting mechanism comprises means for defining an air breather hole which communicates at one end thereof with an ambient space and at the other end thereof with the space while the at least one part is moved in the guide passage and before the two parts contact each other and initiate a relative movement thereof to achieve the interference fit.

According to a seventh preferred form of the present apparatus, a welding mechanism is further provided for welding together contacting surfaces of the two parts by friction heat generated at the contacting surfaces during the relative movement.

This seventh preferred form of the apparatus is effective to assure higher bonding strength at the interference fit owing to the welding of the contacting surfaces.

According to an eighth preferred form of the present apparatus, a temperature adjusting mechanism is further provided for adjusting a thermal condition under which a movement of the at least one part by the kinetic energy is effected.

The above form of the apparatus assures stable movement of the at least one part irrespective of a variation in the thermal condition.

The second object indicated above may also be achieved according to a fourth aspect of the present invention, which provides an apparatus for effecting an interference fit of a rigid portion of first part and an elastic portion of a second part, comprising: (a) a first holder device for holding the first part; (b) a second holder device for holding the second part such that the second part is movable toward the first part held by the first holder device; (c) an accelerating device for accelerating the second part held by the second holder device, toward the first part held by the first holder device; and (d) means for defining a high-pressure chamber in which the second part is moved by the kinetic energy and in which the elastic portion of the second part is subjected to deformation in a direction that permits an increase in an amount of an clearance between the rigid and elastic portions of the first and second parts, the deformation being caused by application of a pressure of a pressurized fluid higher than an atmospheric pressure to a surface of the elastic portion of the second part which mates with a corresponding surface of the rigid portion of the first part, the interference fit being achieved by engagement of the rigid and elastic portions with each other before the elastic portion is freed from the deformation.

The apparatus according to the fourth aspect of the invention will be described for clarification thereof.

(1) According to one preferred form of the present apparatus, the elastic portion of the second part is a substantially cylindrical elastic portion, and the second part further has a cylindrical rigid portion which is positioned relative to the substantially cylindrical elastic portion such that the elastic portion is in contact with the rigid portion only at axially opposite ends thereof and is radially spaced apart from the rigid portion at an axially intermediate portion thereof so as to define an annular void which permits easy elastic compressive deformation of the elastic portion upon application of a compressive force to the elastic portion in its radial direction.

(2) According to another preferred form of the present apparatus, the second holder device includes an accelerating portion in which the second part is given a thrust force and thereby accelerated toward the first part by the accelerating device without a contact of the second part with any mechanical member to give the thrust force, and a compressing portion in which the pressure of the pressurized fluid is applied to the above-indicated surface of the elastic portion of the second part, the accelerating and compressing portions being arranged in the order of description in the direction in which the second part is accelerated toward the first part.

(3) According to a further preferred form of the present apparatus, the elastic portion of the second part is a substantially cylindrical elastic portion which provides an outer circumferential surface of the second part, and the accelerating device accelerates the second part by application of a pressure of a pressurized fluid (e.g., pressurized gas or liquid) to the second part. Further, the second holder device has a small-diameter passage and a large-diameter passage through which the second part is moved toward the first part and which communicate with each other. These small-diameter and large-diameter passages are disposed coaxially with each other in the order of description in the direction in which the second part is accelerated toward the first part. The small-diameter passage has a diameter determined such that the substantially cylindrical elastic portion of the second part substantially air-tightly and slidably engages the small-diameter passage, while the large-diameter passage has a diameter such that an annular space is formed between the outer circumferential surface of the elastic portion and an inner circumferential surface of the large-diameter passage, so that the small-diameter passage is disconnected from the large-diameter passage by the elastic portion of the second part located in the small-diameter passage, whereby the pressure in the small-diameter passage can be increased by the pressurized fluid so as to accelerate the second part toward the large-diameter passage. When the second part is moved into the large-diameter passage, the small-diameter passage is brought into communication with the large-diameter passage through the annular space, so that the compressed air is introduced into the large-diameter passage so as to increase the pressure in the large-diameter passage, whereby the pressure of the pressurized fluid acts on the surface of the elastic portion of the second part which is to mate with the corresponding surface of the rigid portion of the first part.

BRIEF DESCRIPTION OF THE DRAWINGS

The above and optional objects, features, advantages and technical and industrial significance of the present invention will be better understood by reading the following detailed description of presently preferred embodiments of the invention, when considered in connection with the accompanying drawings, in which:

FIG. 17 is an elevational view in cross section showing a press-fit assembly of an outer sleeve and an inner sleeve with a rubber bushing, which are assembled by the apparatus of FIG. 16;

FIG. 18 is a graph for explaining a motion of one part relative to another in the method according to the present invention; and FIG. 19 is a graph for explaining a motion of a second part relative to a first part in the interference-fit method of this invention, and a distribution of a stress acting on the second part upon abutting contact of the second part with the first part.

DETAILED DESCRIPTION OF THE PREFERRED EMBODIMENTS

Several presently preferred embodiments of the invention will be described in detail by reference to the drawings.

1. FIRST PREFERRED EMBODIMENT

Figure 1:
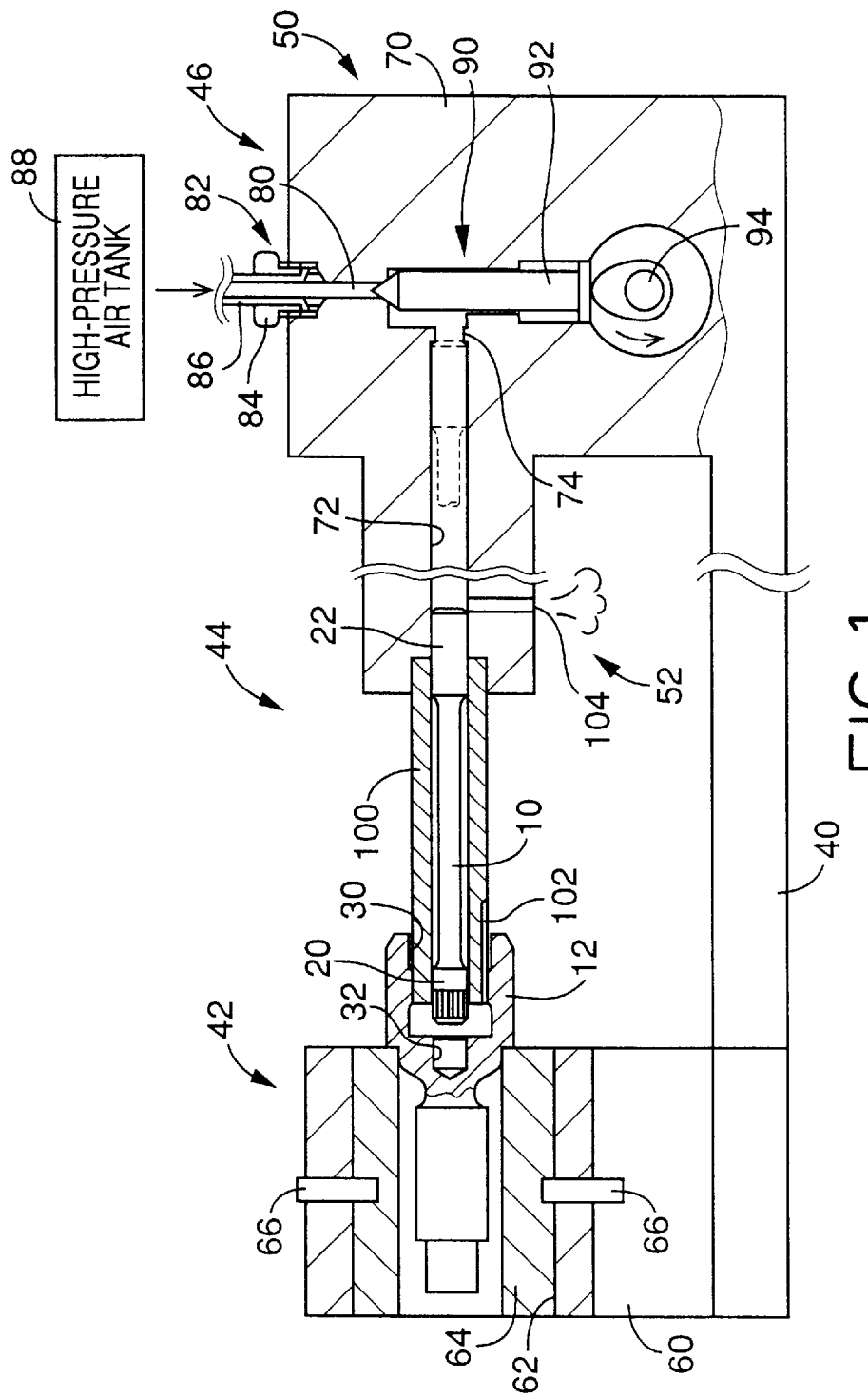
FIG. 1 is a front elevational view in cross section of an assembling apparatus suitable for practicing a method of effecting an interference fit of two mating parts according to one embodiment of the present invention.
Figure 2:
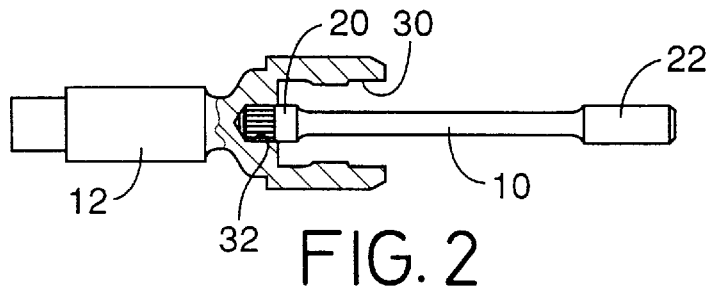
FIG. 2 is a front elevational view partly in cross section of a press-fit assembly of a torsion bar and an output shaft as the two mating parts, which are assembled by the assembling apparatus of FIG. 1.

Referring first to FIG. 1, there is shown an assembling apparatus adapted to effect an interference fit of two parts in the form of a torsion bar 10 and an output shaft (e.g., pinion shaft) 12 shown in FIG. 2, which are components of a power steering device of a motor vehicle and constitute a press-fit assembly.

The power steering device is provided in an automobile steering system in which a steering wheel operated by the vehicle operator is operatively linked with tired steering wheels of the vehicle such that the steering torque applied by the vehicle operator to the steering wheel is hydraulically boosted, as well known in the art. The power steering device includes a pressure control valve which is connected to a pressure source (e.g., oil pump) and adapted to appropriately switch hydraulic pressure lines according to a relationship between the angular position of the steering wheel and the steering angle of the tired steering wheels, so that the hydraulic pressure is supplied from the pressure source to a steering mechanism when the steering torque produced by the vehicle operator is not sufficient. The torsion bar 10 is provided as an input mechanism for the control valve, and connected at one end thereof to a member which rotates with the steering wheel. The torsion bar 10 is connected at the other end to the output shaft 12, which in turn is connected to the steering mechanism via suitable motion converting mechanism. The relationship between the angular position of the steering wheel and the steering angle of the tired steering wheels is represented by the amount of torsion of the torsion bar 10. The control valve is controlled on the basis of the amount of torsion of the torsion bar 10. For example, the output shaft 12 is a pinion shaft having a pinion formed thereon, and the motion converting mechanism includes this pinion on the pinion shaft, and a rack formed on a steering bar which is an element of the steering mechanism.

As shown in FIG. 2, the torsion bar 10 is a shaft having a length in its axial direction and opposite axial end portions in the form of large-diameter portions 20, 22. The large-diameter portion 20 is press-fitted in the output shaft 12 so as to achieve an interference fit. To facilitate the press fitting, the large-diameter portion 20 is provided at its outer circumferential surface with suitable structural means for permitting comparatively easy deformation of the output shaft 12. For example, the large-diameter portion 20 is serrated at its outer circumferential surface.

The output shaft 12 includes a stepped-hole portion having a large-diameter hole 30 and a small-diameter portion 32. The large-diameter portion 30 is open at one axial end of the output shaft 12, and the small-diameter hole 32 is formed so as to be open to the bottom of the large-diameter portion 30. The torsion bar 10 and the output shaft 12 are assembled such that the large-diameter portion 20 of the torsion bar 20 is press-fitted in the small-diameter hole 32 of the output shaft 12.

In the present embodiment, a press-fitted assembly of the torsion bar 10 and the output shaft 12 is prepared by the assembling apparatus of FIG. 1, by effecting an interference fit between the large-diameter portion 20 of the torsion bar 10 and the small-diameter hole 32 of the output shaft 12, namely, by press-fitting the large-diameter portion into the small-diameter hole 32.

The assembling apparatus of FIG. 1 includes a base 40, a first holder device 42 for holding the output shaft 12 (first part), a second holder device 44 for holding the torsion bar 10 (second part) which is press-fitted in the output shaft 12, and a motion control device 46 for controlling the motion of the torsion bar 10 held by the second holder device 44. The first holder device 42 holds the output shaft 12 such that the output shaft 12 is fixed in position so as to extend in the horizontal direction. The second holder device 44 holds the torsion bar 10 such that the torsion bar 10 extends in the horizontal direction and is movable toward the output shaft 12 held by the first holder device 42. The first and second holder devices 42. 44 and the motion control device 46 are all mounted on the base 40. The motion control device 46 includes an accelerating device 50 and an inertial motion mechanism 52.

The first holder device 42 is equipped with a frame 60 fixed on the base 40. The frame 60 has a horizontally extending bore 62 in which is removably received a holder member in the form of a cylindrical member 64. The cylindrical member 64 is positioned and locked in place relative to the frame 60 by a positioning and locking member in the form of a pair of pins 66. These pins 66 are inserted in radial holes formed in the frame 60 and the cylindrical member 64, for positioning the cylindrical member 64 relative to the frame 60 and preventing removal of the cylindrical member 64 from the frame 60.

The output shaft 12 is held by the first holder device 42 in the manner described below.

Initially, the pair of pins 66 are removed from the first holder device 42, and the cylindrical member 64 is removed from the frame 60. Then, the output shaft 12 is fixed to the cylindrical member 64 such that the output shaft 12 is coaxial with the cylindrical member 64. The cylindrical member 64 with the output shaft 12 fixed thereto is mounted on the frame 60, and is locked to the frame 60 by the pins 66.

The second holder device 44 is equipped with a frame 70 also fixed on the base. The frame 70 has a holder hole 72 formed for coaxial alignment with the output shaft 12 held by the first holder device 42. The holder hole 72 is open at one end thereof on the side of the first holder device 44, and has a stop portion 74 at the other end or inner end. The holder hole 72 is provided to receive the torsion bar 10 with substantial air tightness between the inner circumferential surface of the hole 72 and the outer circumferential surfaces of the large-diameter portions 20, 22 of the torsion bar 10. In the holder hole 72, the torsion bar 10 is slidably movable toward the output shaft 12 held by the first holder device 42. The stop portion 74 is provided to position the torsion bar 10 at the predetermined initial position in the holder hole 72, that is, in the second holder device 44, as indicated by broken line in FIG. 1.

The frame 70 has an air passage 80 which communicates with the inner end of the holder hole 72 and a port 82. The port 83 is connected via a plug 84 and a tube 86 to a high-pressure air tank 88 which stores a pressurized fluid in the form of compressed air. The air tank 88 is an example of a high-pressure fluid reservoir which stores a fluid under pressure. The air passage 80 is provided with a control valve in the form of a needle valve 90 which includes a valve body 92 and a cam 94. The valve body 92 is slidably received in the frame 70, and operated by the cam 94 between a closed position of FIG. 1 for closing the air passage 80 and an open position for opening the air passage 80. In the closed position, the compressed air supplied from the high-pressure air tank 88 (as an example of a pressurized fluid) is inhibited from flowing into the holder hole 72. In the open position, the compressed air from the tank 88 is allowed to flow into the holder hole 72 for advancing the torsion bar 10 toward the output shaft 12. The cam 94 disposed for sliding contact with the end face of the valve body 92 to thereby move the valve body 92 between the closed and open positions is rotated by a suitable drive device, so that the needle valve 90 can be closed and opened as needed.

The second holder device 44 also includes a guide member in the form of a guide tube 100, which is fixed at one end portion thereof to a portion of the frame 70 which defines the open end portion of the holder hole 72. The guide tube 100 is disposed such that the other end portion is located within the large-diameter hole 30 of the output shaft 12 held by the first holder device 42. The guide tube 100 has an inside diameter determined to permit the torsion bar 10 to slidably move therethrough such that substantial air tightness is maintained between the inner circumferential surface of the guide tube 100 and the outer circumferential surfaces of the large-diameter portions 20, 22 of the torsion bar 10. Since the core formed through the guide tube 100 is aligned with the small-diameter hole 32 of the output shaft 12, the torsion bar 10 is slidably guided by the guide tube 100, so as to permit the large-diameter portion 20 of the torsion bar 10 to be press-fitted into the small-diameter hole 32 when the torsion bar 10 is moved from the holder hole 72 toward the output shaft 12 through the guide tube 100, as described below. In the present embodiment, the holder hole 72 cooperates with the guide tube 100 to provide a guide passage for guiding the torsion bar 10 toward the output shaft 12.

The end portion of the guide tube 100 fitted in the large-diameter hole 30 of the output shaft 12 has an axial groove 102 formed in its outer circumferential surface. A portion of the output shaft 12 which defines the large-diameter hole 30 cooperates with this axial groove 102 to provide an air breather communicating at one end thereof with the atmosphere (ambient space) and at the other end with an air chamber which is defined by the stepped-hole portion of the output shaft 12, the end face of the guide tube 100 and the end face of the torsion bar 10 when the large-diameter portion 30 of the torsion bar 10 has been moved into the large-diameter hole 30. This air breather permits the air in the above-indicated air chamber to be discharged into the atmosphere as the volume of the air chamber decreases with the movement of the torsion bar 10 toward the output shaft 12. Consequently, the air breather prevents or restricts an increase in the air pressure in the air chamber to which the large-diameter portion 20 of the torsion bar 10 is exposed. In other words, the air breather which is defined by the axial groove 102 and the portion of the output shaft 12 which closes the axial groove 102 functions to maintain the above-indicated air chamber at a pressure almost equal to the atmospheric pressure, even when the volume of the air chamber decreases as the torsion bar 10 is advanced toward the small-diameter hole 32 of the output shaft 12.

The frame 70 further has a communication hole 104 for communication of the holder hole 72 with the atmosphere (ambient space). The communication hole 104 is located such that the holder hole 72 is brought into communication with the atmosphere when the torsion bar 10 has been advanced toward the output shaft 12 to a predetermined position a short distance behind the opening of the small-diameter hole 32. That is, the communication hole 104 is disconnected from the inner portion of the holder hole 72 (and the air passage 80) by the large-diameter portion 20 of the torsion bar 10 while the torsion bar 10 is placed in the initial position indicated by broken line in FIG. 1. When the torsion bar 10 has been advanced to the above-indicated predetermined position at which the front large-diameter portion 20 is spaced only a short distance away from the open end of the small-diameter hole 32, the rear large-diameter portion 22 has passed the open end of the communication hole 104, permitting the inner portion of the holder hole 72 and the air passage 80 to communicate with the atmosphere through the communication hole 104. In this arrangement, the pressure substantially equal to the atmospheric pressure acts on the rear end face of the torsion bar 10 shortly before the front large-diameter portion 20 of the torsion bar 10 comes into abutting contact with the output shaft 12, so that an accelerating motion of the torsion bar 10 by the compressed air supplied from the high-pressure air tank 88 is converted into a substantially inertial motion of the torsion bar 10 when the rear large-diameter portion 22 has passed the inner open end of the communication hole 104. As a result, the torsion bar 10 is brought into abutting contact with the output shaft 12 during the substantially inertial motion of the torsion bar 10 through the guide tube 100 at a substantially constant velocity.

It will be understood that the air passage 80, high-pressure air tank 88, needle valve 90 and cam 94 constitute a major portion of the accelerating device 50 for accelerating the torsion bar 10, while the portion of the frame 70 which defines the communication hole 104 provides the inertial motion mechanism 52 for permitting the torsion bar 10 to move at a substantially constant velocity. It will also be understood that these accelerating device 50 and the inertial motion mechanism 52 cooperate to constitute the motion control device 46 for controlling the motion of the torsion bar 10 toward the output shaft 12.

In the conventional interference-fit method and apparatus, the front end portion of the torsion bar 10 is forced into the small-diameter hole 32 of the output shaft 12 by forcing the torsion bar 10 toward the output shaft 12 such that the pressure head is held in direct pressing contact with the rear end portion of the torsion bar 10. As a result, the torsion bar 10 is subjected to an axial compressive stress evenly over the entire axial length during press-fitting movement of the torsion bar 10 relative to the output shaft 12, as indicated in the lower part of FIG. 2. This conventional arrangement tends to cause damaging or scoring of the rear end portion of the torsion bar 10 and/or plastic bending of the torsion bar 10 due to the even distribution of the axial compressive stress acting on the torsion bar 10.

Figure 4:
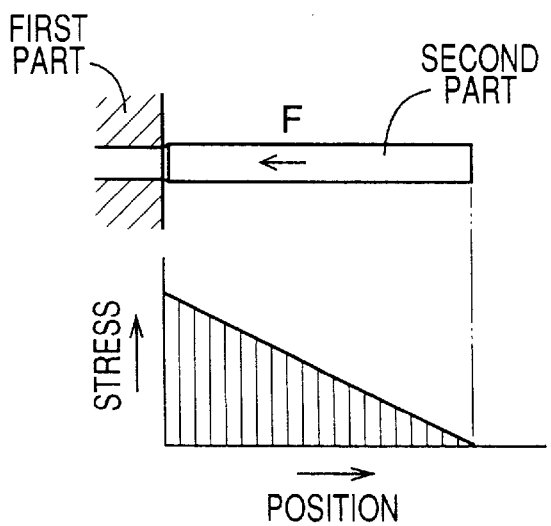
FIG. 4 is a view for explaining the principle of interference-fit method and apparatus according to the present invention, and an advantage thereof.

In the method and apparatus according to the present invention, on the other hand, the press-fitting operation to force the front large-diameter portion 20 of the torsion bar 10 into the small-diameter hole 32 of the output shaft 12 is effected by the kinetic energy given to the torsion bar 10. The relative velocity of the torsion bar 10 and the output shaft 12 is generally held within a range of 30–100 m/s. In this arrangement, the axial compressive stress acting on the torsion bar 10 during the press-fitting operation continuously decreases in the direction from the front large-diameter portion 20 toward the rear large-diameter portion 22, as indicated in the lower part of FIG. 4, so that the rear end portion of the torsion bar 10 does not suffer from the axial compressive stress. Accordingly, the present embodiment is effective to eliminate or minimize the conventionally experienced damaging or scoring of the rear end portion of the torsion bar 10 and/or plastic bending of the torsion bar 10 during the press-fitting operation.

The reduced amount of deformation of the torsion bar 10 during the press-fitting operation makes it possible to increase the force used for forcing the large-diameter portion 20 into the small-diameter hole 32, and therefore increase the amount of interference of the fit of the two parts 10, 12. This means a comparatively easy increase in the bonding force at the interference or force fit.

Further, the use of the compressed air pressure for driving the torsion bar 10 at a high velocity for achieving the interference fit with the output shaft 12 facilitates reduction of the time required for performing the press-fitting operation to produce each assembly of the torsion bar 10 and the output shaft 12. Namely, the present embodiment is effective to reduce the production cycle time and improve the efficiency of production of the assembly 10, 12.

It is also appreciated that the provision of the axial groove 102 in the guide tube 100 prevents an energy loss or pumping loss of the accelerating device 50 due to an increase in the pressure acting on the front end face of the front large-diameter portion 20 of the torsion bar 10 during the accelerating motion stroke and the following substantially inertial motion stroke. Accordingly, the torsion bar 10 is efficiently accelerated by the accelerating device 50 (by the compressed air), and the intended inertial motion of the torsion bar 10 is obtained.

2. SECOND PREFERRED EMBODIMENT

Figure 5:
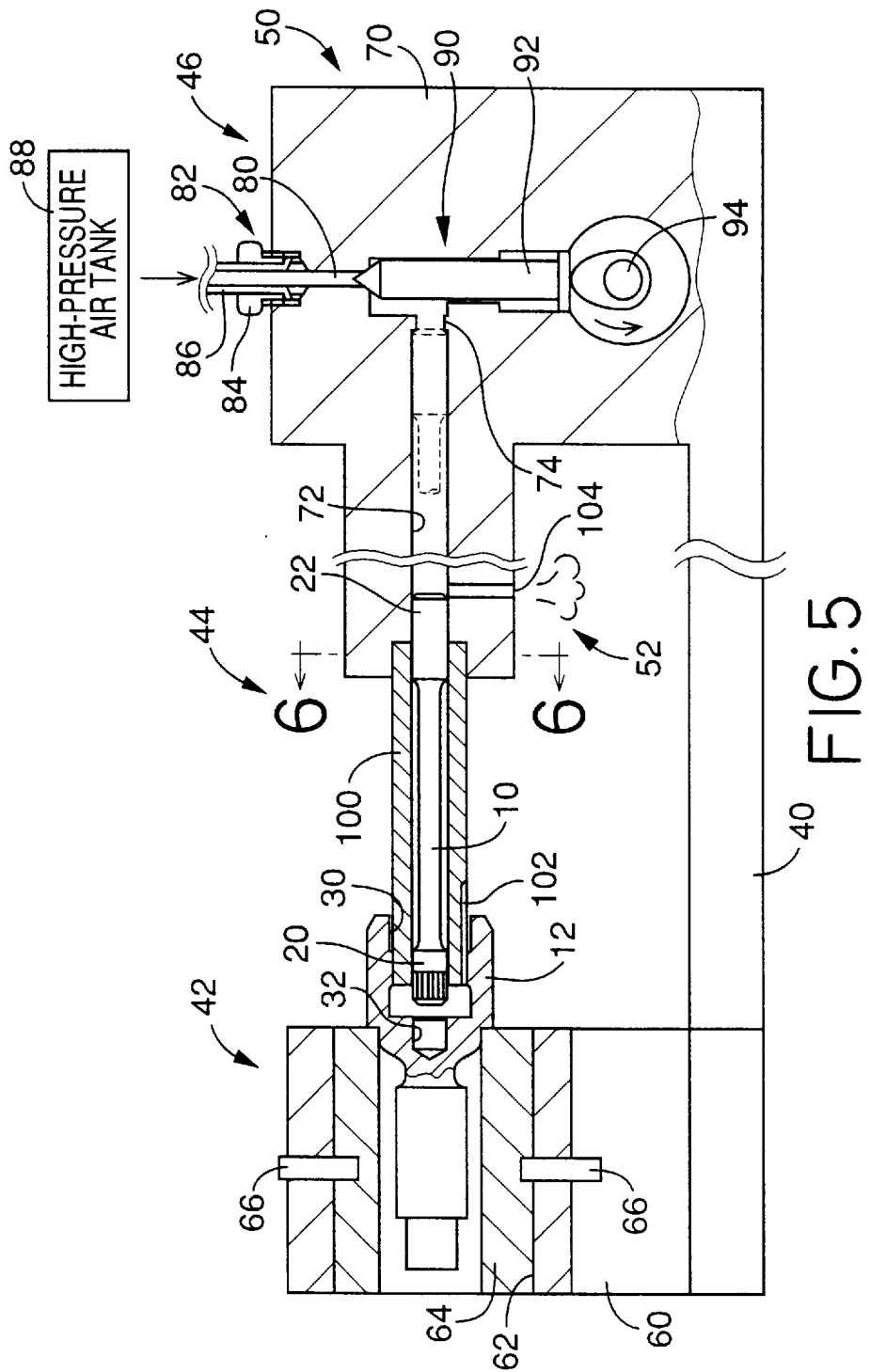
FIG. 5 is a front elevational view in cross section of an assembling apparatus for practicing the interference-fit method according to a second embodiment of this invention.
Figure 6:
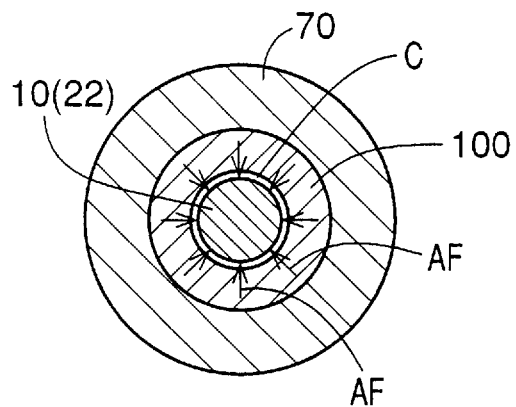
FIG. 6 is a cross sectional view taken along line 6—6 of FIG. 5.

Referring next to FIGS. 5 and 6, there will be described an assembling apparatus adapted to practice the interference-fit method according to the second preferred embodiment of this invention.

The assembling apparatus of FIG. 5 is basically identical in construction with that of the first embodiment of FIG. 1, and is characterized by a clearance between the torsion bar 10 and the inner circumferential surface of the guide passage 72, 100, which clearance is determined so as to provide an air bearing effect for supporting the torsion bar 10 as described below in detail.

As described below, the guide passage for guiding the torsion bar 10 from the second holder device 44 toward the output shaft 12 held by the first holder device 42 is provided by the holder holder 72 and the guide tube 100. Referring to the enlarged cross sectional view of FIG. 6, the dimensional relationship between the guide tube 100 and the rear large-diameter portion 22 of the torsion bar 10 will be described by way of example. The guide tube 100, which is fixed at its rear end portion to the frame. 70, is adapted to receive the torsion bar 10 for free movement through the bore in the guide tube 100. The outside diameter of the large-diameter portions 20, 22 of the torsion bar 10 and the diameter of the bore of the guide tube 100 are determined so as to provide a suitable clearance C between the outer circumferential surfaces of the large-diameter portions 20, 22 and the inner circumferential surface of the guide tube 100, as indicated in FIG. 6, whereby the compressed air fed from the accelerating device 50 is supplied to the clearance C so that the pressure of the compressed air in the clearance C supports the torsion bar 10 during its movement without sliding contact with the inner surface of the guide tube 100. That is, the amount of the clearance C is determined so that the compressed air provides an air bearing force AF as indicated by arrows in FIG. 6, which is sufficient to hold the torsion bar 10 in a floating state within the bore of the guide tube 100. The clearance C is also provided between the large-diameter portions 20, 22 of the torsion bar 10 and the inner surface of the holder hole 72 formed through the frame 70.

In the present second embodiment, the inside diameter of the holder hole 72 and the guide tube 100 is determined to provide the clearance C between the outer circumferential surfaces of the large-diameter portions 20, 22 of the torsion bar 10 and the inner surfaces of the holder hole 72 and the guide tube 100, so that the air pressure in the clearance C provides the air bearing force AF for advancing movement of the torsion bar 10 in the floating state through the holder hole 72 and guide tube 100. Thus, the accelerating device 50, holder hole 72 and guide tube 100 cooperate to provide a support mechanism for supporting the torsion bar 10 in the air bearing or floating state in the guide passage 72, 100, without a contact of the torsion bar 10 with the inner surface of the guide passage.

Since the torsion bar 10 supported in the guide passage 72, 100 in the air bearing state is accelerated in the guide passage with substantially no contact with the frame 70 or guide tube 100, the sliding resistance of the torsion bar 10 with respect to the guide passage 72, 100 is substantially zeroed for maximum acceleration of the torsion bar 10 by the accelerating device 50, and the outer surfaces of the torsion bar 10 and the inner surface of the guide passage are effectively protected against damage due to frictional contact therebetween.

To improve the air bearing or floating effect for the torsion bar 10, it is effective to increase the pressure of the compressed air as compared with the pressure (back pressure) acting on the front end face of the torsion bar 10, or reduce the clearance C between the torsion bar 10 and the guide passage 72, 100, or alternatively reduce a ratio of the weight of the torsion bar 10 (second part to be accelerated by the accelerating device 50) to the area of the outer circumferential surface of the torsion bar 10. In the present embodiment, the pressure acting on the front end face of the torsion bar 10 during the press-fitting operation is kept at a level substantially equal to the atmospheric pressure in the presence of the air breather provided by the axial groove 102, as described above. In other words, the air breather 102 prevents an increase in the pressure acting on the front end face of the torsion bar 10 during the advancing movement, so that the suitable determination of the clearance C and the air breather cooperates to provide a sufficiently high air bearing or floating effect for the torsion bar 10.

3. THIRD PREFERRED EMBODIMENT

Referring next to FIGS. 7–13, the third embodiment of this invention will be described. The method according to this third embodiment is practiced by an assembling apparatus basically identical with those of the first and second embodiments. However, the appropriate parameters of the press-fitting operation are determined so that the front large-diameter portion 20 of the torsion bar 10 is fusion-welded to the small-diameter hole 32 of the output shaft 12 due to friction heat generated in the process of an interference fit of the two members. In the present embodiment, the torsion bar 10 is fixed or bonded to the output shaft 12 by both elastic bonding due to the interference fit and mechanical bonding due to the fusion welding.

Figure 7:
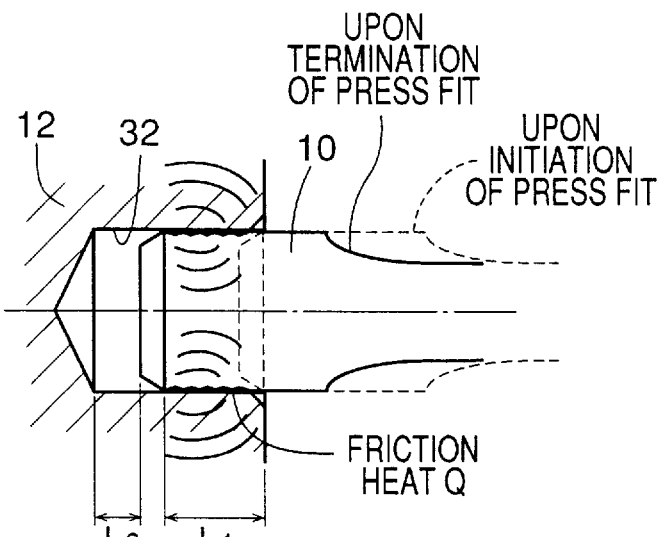
FIG. 7 is a cross sectional view for explaining fusion welding in the interference-fit method according to a third embodiment of the invention.
Figure 8:
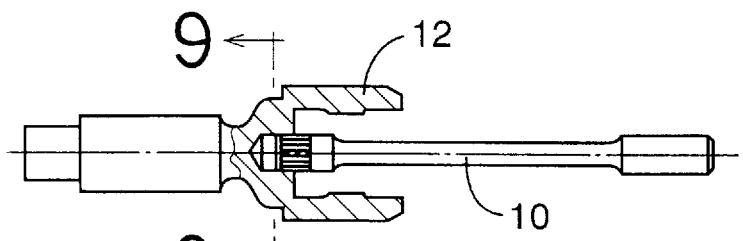
FIG. 8 is an elevational view showing a press-fit assembly of a torsion bar and an output shaft, which are assembled by the interference-fit method according to the third embodiment.
Figure 9:
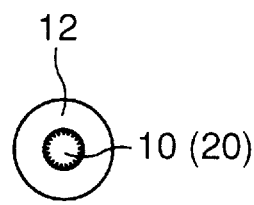
FIG. 9 is a cross sectional view taken along line 9—9 of FIG. 8.

The present third embodiment is arranged so that a friction heat Q is generated at the contact surfaces of the torsion bar 10 and the output shaft 12 during the press-fitting movement of the torsion bar 12 relative to the output shaft 12, as indicated in FIG. 7. In this figure, broken line indicates the position of the torsion bar 10 upon initiation of the press-fitting operation, while solid line indicates the position of the same upon termination of the press-fitting operation. That is, the present embodiment is adapted such that the front end of the torsion bar 10 is advanced to a position which is a predetermined distance Lo away from the bottom (effective-depth bottom) of the small-diameter hole 32 of the output shaft 12, so that the axial length of the interference fit of these members 10, 12 is equal to L1, as indicated in FIG. 7.

It is noted that the amount of the friction heat Q and the resulting temperature at the interface of the torsion bar 10 and the output shaft 12 during the press-fitting operation increase with an increase in a press-fitting velocity V which is an advancing speed of the torsion bar 10 relative to the output shaft 12. Stated differently, the amount of the friction heat Q and the resulting temperature can be increased for sufficient fusion welding of the torsion bar 10 and the output shaft 12, by increasing the press-fitting velocity V. However, the press-fitting velocity V influences the relative position of the torsion bar 10 and the output shaft 12 upon termination of the press-fitting operation. In this respect, the freedom of selection of the press-fitting velocity V is limited. On the other hand, the position of the torsion bar 10 upon termination of the press-fitting operation can be changed by adjusting the amount of interference d between the large-diameter portion 20 and the small-diameter hole 32, which amount corresponds to the amount of rupture or deformation of the two mating parts 20, 32. To meet the above-indicated requirement of the position of the torsion bar 10 upon termination of the press-fitting operation while assuring the press-fitting velocity V high enough for the fusion welding, the amount of interference d should be adequately controlled.

Based on the above analysis, the present inventors conducted an experimentation in which press-fitting operations of the torsion bar 10 and the output shaft 12 were repeatedly performed with different combinations of the press-fitting velocity V and the interference amount d. The experimentation revealed the relationship between the press-fitting velocity V and the interference amount d, which is suitable for obtaining the friction heat Q sufficient for permitting the intended fusion welding of the torsion bar 10 and the output shaft 12. The relationship is represented by the following inequity:

$$500 < V/d < 1000$$

where,
V=pressing-fitting velocity V (m/s)
d=interference amount d (mm)

The above range of the ratio V/d applies to the specific case where the torsion bar 10 and the output shaft 12 used in the experimentation are made of SCM440 (chrome molybdenum alloy steel) and SC33(boron steel), respectively.

Figure 3:
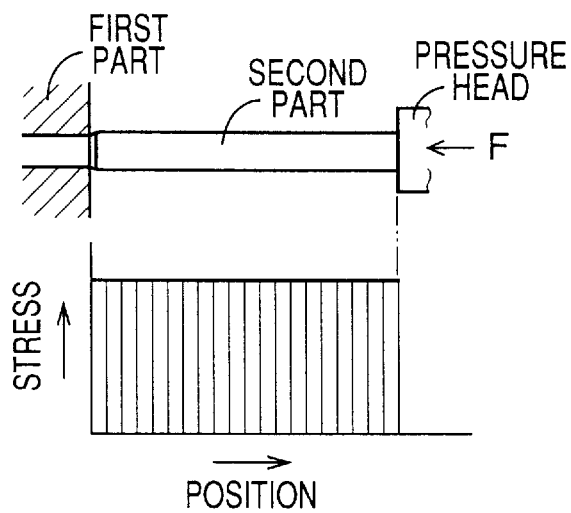
FIG. 3 is a view for explaining the principle of conventional interference-fit method and apparatus, and a problem thereof.
Figure 10:
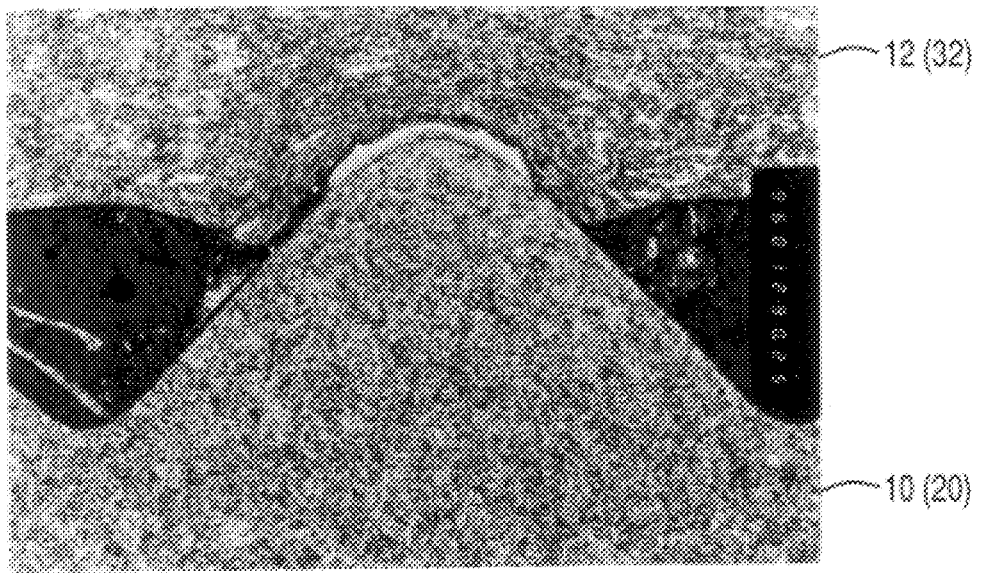
FIG. 10 is a photomicrograph showing in cross section a press-fit portion of the mating parts assembled by the interference-fit method according to the third embodiment of the invention.
Figure 11:
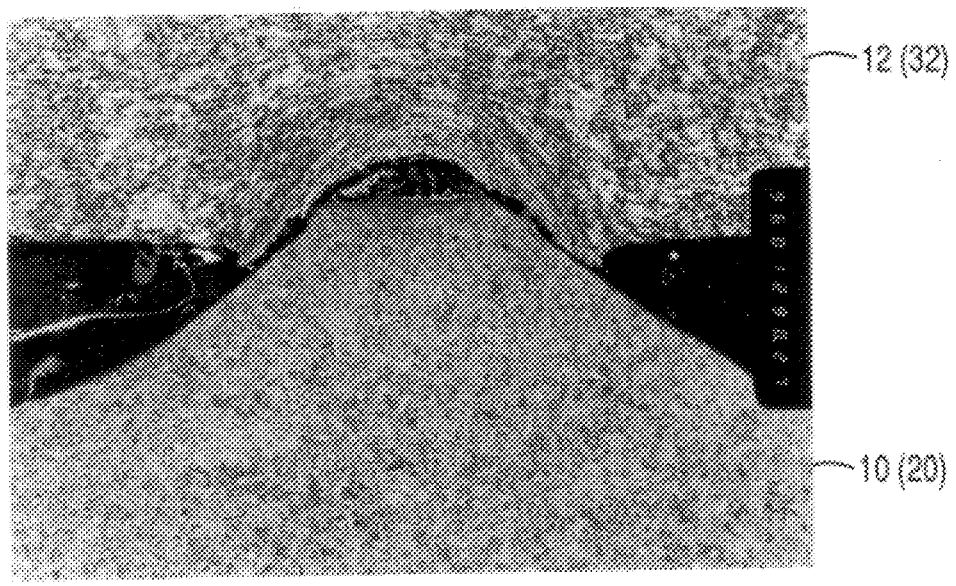
FIG. 11 is a photomicrograph showing in cross section a press-fit portion of the mating parts assembled according to the conventional interference-fit method.
Figure 12:
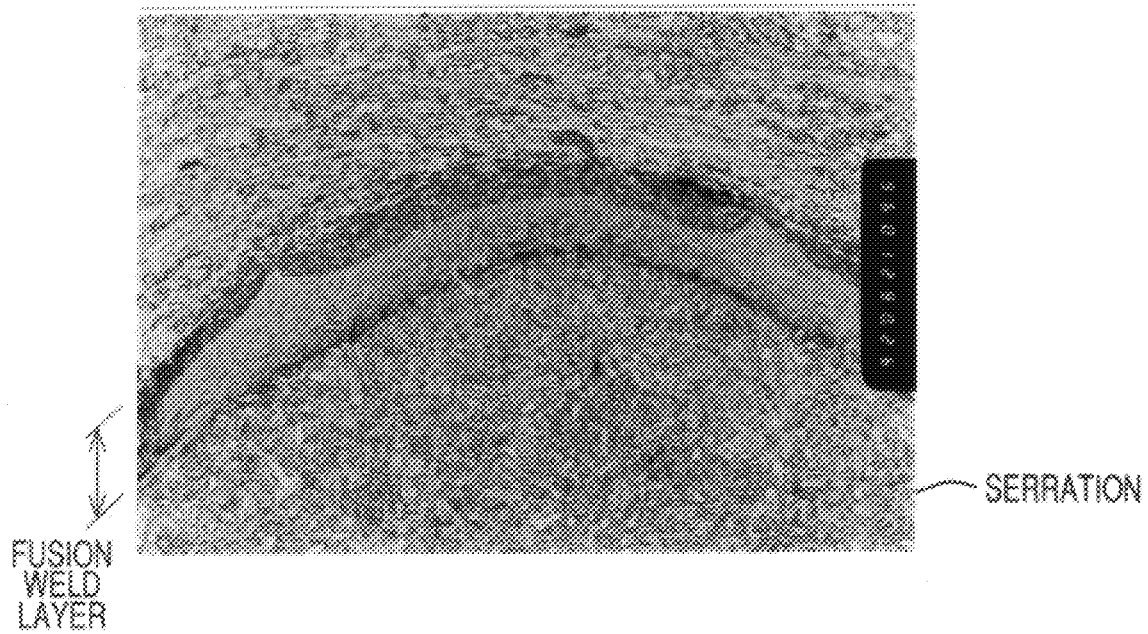
FIG. 12 is a photomicrograph showing in enlargement the press-fit portion shown in FIG. 10.
Figure 13:
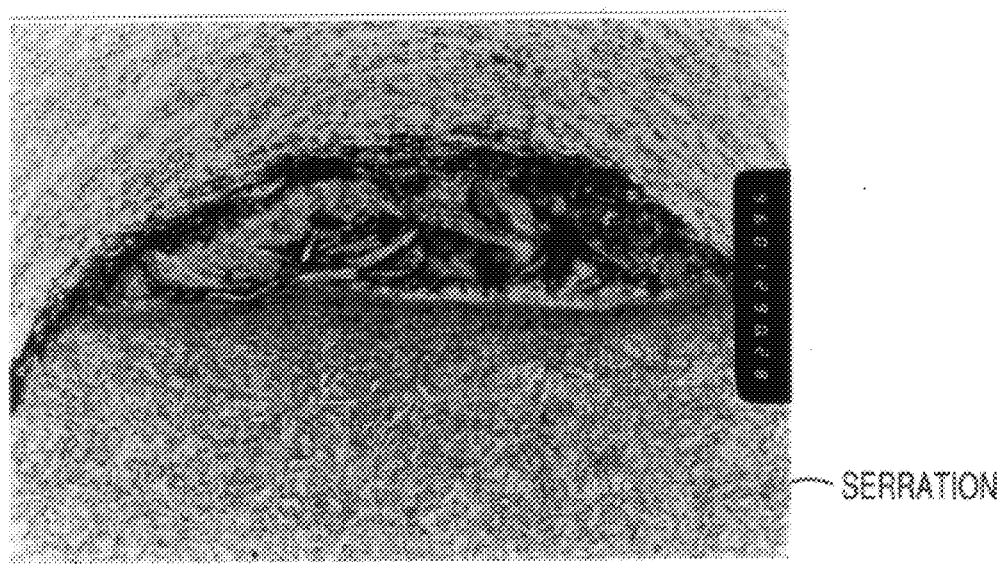
FIG. 13 is a photomicrograph showing in enlargement the press-fit portion shown in FIG. 11.

FIGS. 10–13 are photomicrographs showing the microstructures at the interface of the large-diameter portion 20 of the torsion bar 10 and the small-diameter hole 32 of the output shaft 12, which were press-fitted together according to the present method and the conventional method. The microstructures shown in the photomicrographs were taken in the cross section of FIG. 9. The photomicrograph of FIG. 10 shows the microstructure obtained according to the present method wherein the ratio V/d is held within the range specified above for assuring the intended fusion welding. The photomicrograph of FIG. 11 shows the microstructure obtained according to the conventional method in which the torsion bar 10 is pushed by the pressure head as indicated in FIG. 3). These photomicrographs of FIGS. 10 and 11 were taken after the press-fitted portion was cut in the plane of FIG. 9 and corroded by alcohol containing 3% of nitric acid. The photomicrograph of FIG. 12 shows in enlargement a part of FIG. 10 which includes the top end portion of one of the projections of the serration formed on the outer circumferential surface of the front large-diameter portion 20 of the torsion bar 10. The photomicrograph of FIG. 13 shows in enlargement the corresponding part of FIG. 11. It will be understood from the four photomicrographs of FIGS. 10–13 that a fusion weld layer was formed as indicated in the photomicrograph of FIG. 12, between the serration of the large-diameter portion 20 of the torsion bar 10 and the mating portion of the small-diameter hole 32 of the output shaft 12 when the press-fitting operation to achieve an interference fit is performed according to the present method in which the ratio V/d is controlled within the range indicated above. On the other hand, the conventional method using the pressure head does not create such a fusion weld layer.

The fusion weld layer shown in FIG. 12 was created as a result of rapid cooling of the materials which were fused by the friction heat Q generated in the process of the press-fitting operation. The rapid cooling took place by rapid transfer of the friction heat Q into the masses of the torsion bar 10 and the output shaft 12 after the termination of the press-fitting operation. The fusion weld layer thus created has a Martensite structure which has Vickers hardness of Hv600 and a high degree of strength.

In the present method wherein the press-fitting operation is effected at a higher velocity V for the intended fusion welding than in the conventional method in which no fusion welding of the mating parts is intended. The motion control device 46 including the high-pressure air tank 88 is considered to function as a welding mechanism for effecting the fusion welding of the large-diameter portion 20 and the small-diameter hole 32.

4. FOURTH PREFERRED EMBODIMENT

Figure 14:
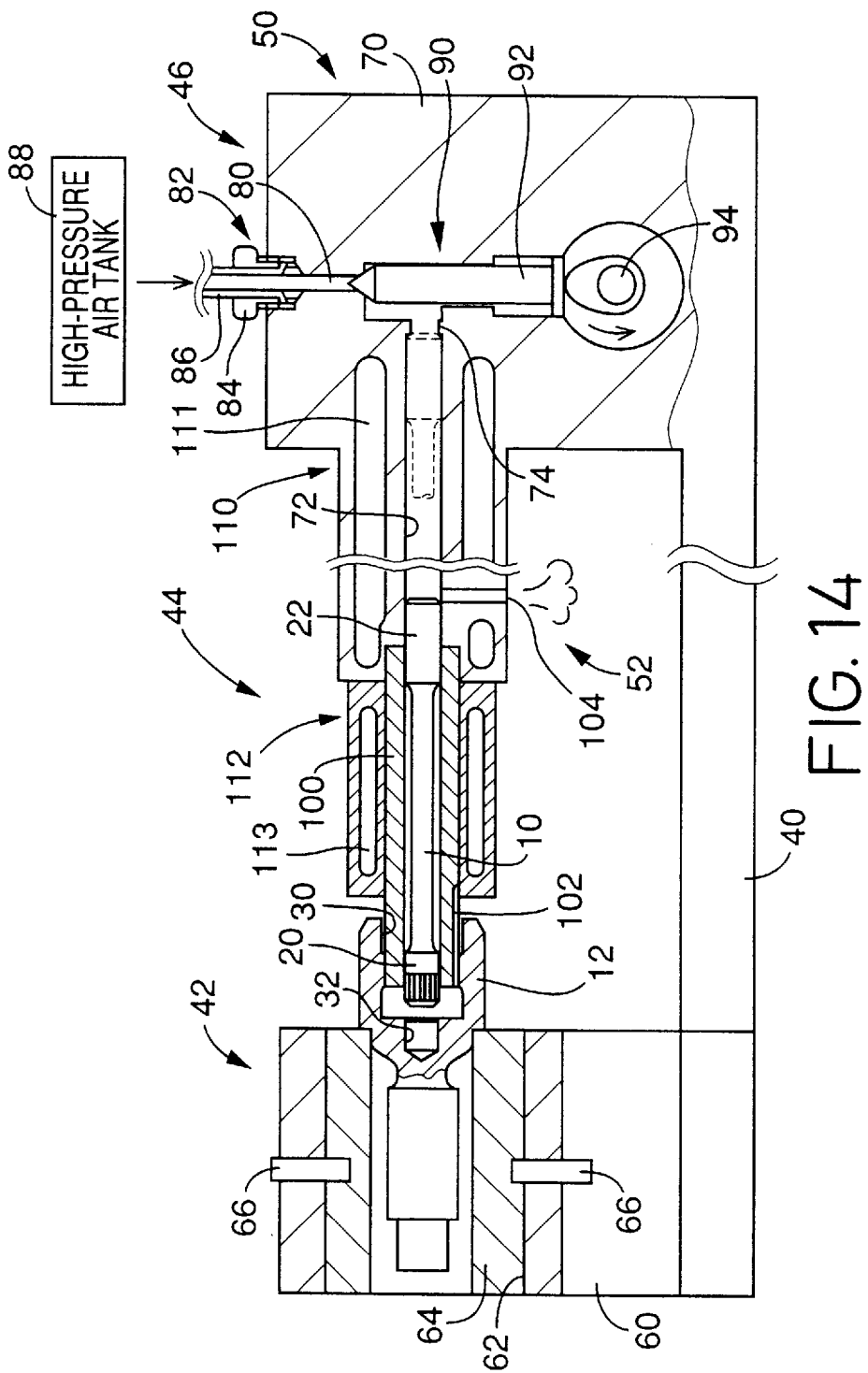
FIG. 14 is is an elevational view showing an assembling apparatus suitable for practicing an interference-fit method according to a fourth embodiment of this invention.

Referring to FIG. 14, an assembling apparatus suitable for practicing the press-fitting method according to the fourth preferred embodiment will be described. This apparatus is basically identical in construction with those of the first through third embodiments which have been described. The apparatus of this fourth embodiment is characterized in that the press-fitting velocity V is controlled to an optimum value by adjusting the temperature of the compressed air which is used as the accelerating medium for advancing the torsion bar 10. Since the volume of the air changes at a relatively high rate with a change in the temperature, the press-fitting velocity V can be suitably adjusted by controlling the temperature of the air.

In the assembling apparatus of FIG. 14, the accelerating device 50 and the second holder device 44 are equipped with a first liquid jacket 110 and a second liquid jacket 112, respectively, which are disposed so as to surround the guide passage 72, 100. Each of these liquid jackets 110, 112 takes the form of a sleeve having an annular liquid passage 111, 113 in which a suitable liquid is circulated for adjusting the temperature of the compressed air in the guide passage 72, 100 so that the press-fitting velocity V is maintained at the optimum value.

The temperature of the compressed air flowing through the accelerating device 50 and the second holder device 44 varies with the temperature of these devices 50, 44, which varies with the ambient temperature. In the present fourth embodiment, however, the liquid circulating through the annular liquid passages 111, 113 functions to reduce the temperature variation of the compressed air due to the varying ambient temperature. It is also noted that heat is transferred from the frame 70 and the guide tube 100 due to adiabatic expansion of the air in the air chamber formed in the guide passage 72, 100 behind the rear end face of the torsion bar 10, each time the torsion bar 10 is accelerated by the compressed air, whereby the temperatures of the frame 70 and the guide tube 100 vary depending upon the number of operating cycle of the assembling apparatus. However, the liquid jackets 110, 112 function to reduce the amount of temperature variation of the accelerating device 50 and the second holder device 44 during the production run of the apparatus.

Further, the present apparatus is operated within a temperature controlled room in which the temperature is kept at 20° C., and suitably heated water is circulated through the annular liquid passage 113 of the liquid jacket 113 surrounding the guide tube 100, so that the air in the guide tube is kept at 30° C.

In this fourth embodiment, the temperature controlled room (not shown), liquid jackets 110, 112 and liquid supply device (not shown) cooperate to provide a mechanism for controlling the temperature of the air in the guide passage 72, 100.

Thus, the present embodiment is adapted so that the temperature which influences the volume of the air and the press-fitting velocity V of the torsion bar 10 is maintained at the optimum level, for maintaining the press-fitting velocity V stably at the optimum value irrespective of the varying ambient temperature and the operating time of the apparatus, whereby the length of the interference or force fit of the two parts 10, 12 is held constant at the nominal value.

The temperature of the air in the guide passage 72, 100 may be controlled so as to be constant over the entire length of the guide passage. In the present embodiment, however, the liquid jackets 110, 112 are adapted such that the temperature of the guide tube 100 is higher by a given value than that of the air in the holder hole 72 and the air passage 80. In other words, the air flowing in the guide tube 10 is heated by a thermal energy transferred from the guide tube 100, whereby the volume of the air is expanded in the guide tube 100, with a result of an increase in the ability of the compressed air to accelerate the torsion bar 10 toward the output shaft 12. Thus, the force generated by the compressed air in the guide tube 100 to accelerate the torsion bar 10 is made higher by the heat transferred from the liquid jacket 112, and the accelerating efficiency is accordingly improved, even if the pressure of the compressed air as supplied from the high-pressure air tank 88 is held constant.

5. FIFTH PREFERRED EMBODIMENT

An assembling apparatus adapted to practice the press-fitting method according to the fifth preferred embodiment is different from the preceding embodiments in the arrangement for accelerating or driving the torsion bar 10 toward the output shaft 12. In the other aspect, the present apparatus is substantially identical in construction with the preceding embodiments, and the same reference numerals as used in the preceding embodiments will be used to identify the functionally corresponding elements in the present fifth embodiment.

Figure 15:
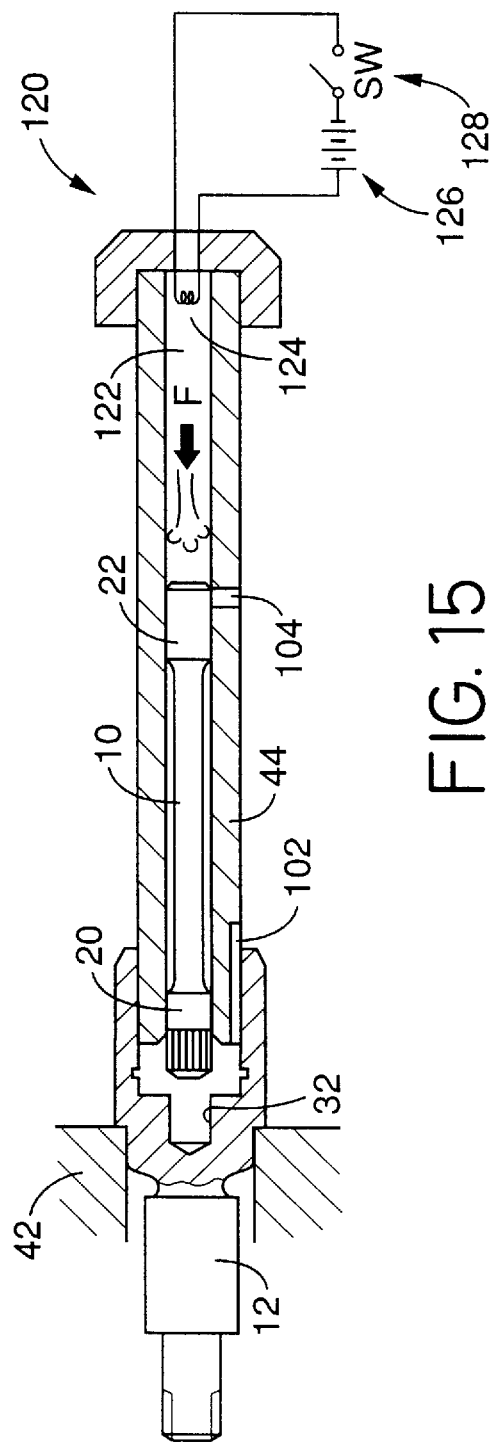
FIG. 15 is a front elevational view in cross section showing an assembling apparatus suitable for practicing an interference-fit method according to a fifth embodiment of the invention.

The apparatus of FIG. 15 includes the second holder device 44 in the form of a sleeve having an air passage 122 in which the torsion bar 10 is slidably and substantially air-tightly received and which is charged with an explosive (e.g., a low explosive). In the present apparatus, the torsion bar 10 is driven by a pressurized fluid in the form of a combustion gas instantaneously generated in a large amount by combustion of the low explosive. To this end, an ignition device 120 is provided.

The ignition device 120 includes a detonator 124 disposed in the rear portion of the air passage 122, which portion is charged with the explosive. The ignition device 120 further includes a power source 126 connected to the detonator 124, and an ignition switch 128. Before the press-fitting operation is performed, the rear portion of the air passage 122 is charged with the selected low explosive (which includes an igniting agent, a firing agent, gas producing agent, etc.). When the ignition switch 128 is turned on, the detonator 124 is activated by an electric current from the power source 126, and a combustion gas is produced as a result of combustion of the explosive. The torsion bar 10 is advanced at a high velocity by the combustion gas acting on the rear end face of the torsion bar 10.

As in the preceding embodiments, the rear large-diameter portion 22 of the torsion bar 10 passes the inner open end of the communication hole 104 immediately before the front large-diameter portion 20 comes into abutting contact with the portion of the output shaft 12 which defines the small-diameter hole 32, as in the preceding embodiments, so that the air passage 122 is brought into communication with the atmosphere through the communication hole 104. Consequently, the force of the combustion gas which has acted on the torsion bar 10 is removed, and the torsion bar 10 is subsequently advanced at a substantially velocity by the given kinetic energy, for press-fitting of the front large-diameter portion 20 in the small-diameter hole 32 of the output shaft 12 during the inertial motion of the torsion bar 10.

6. SIXTH EMBODIMENT

Figure 16:
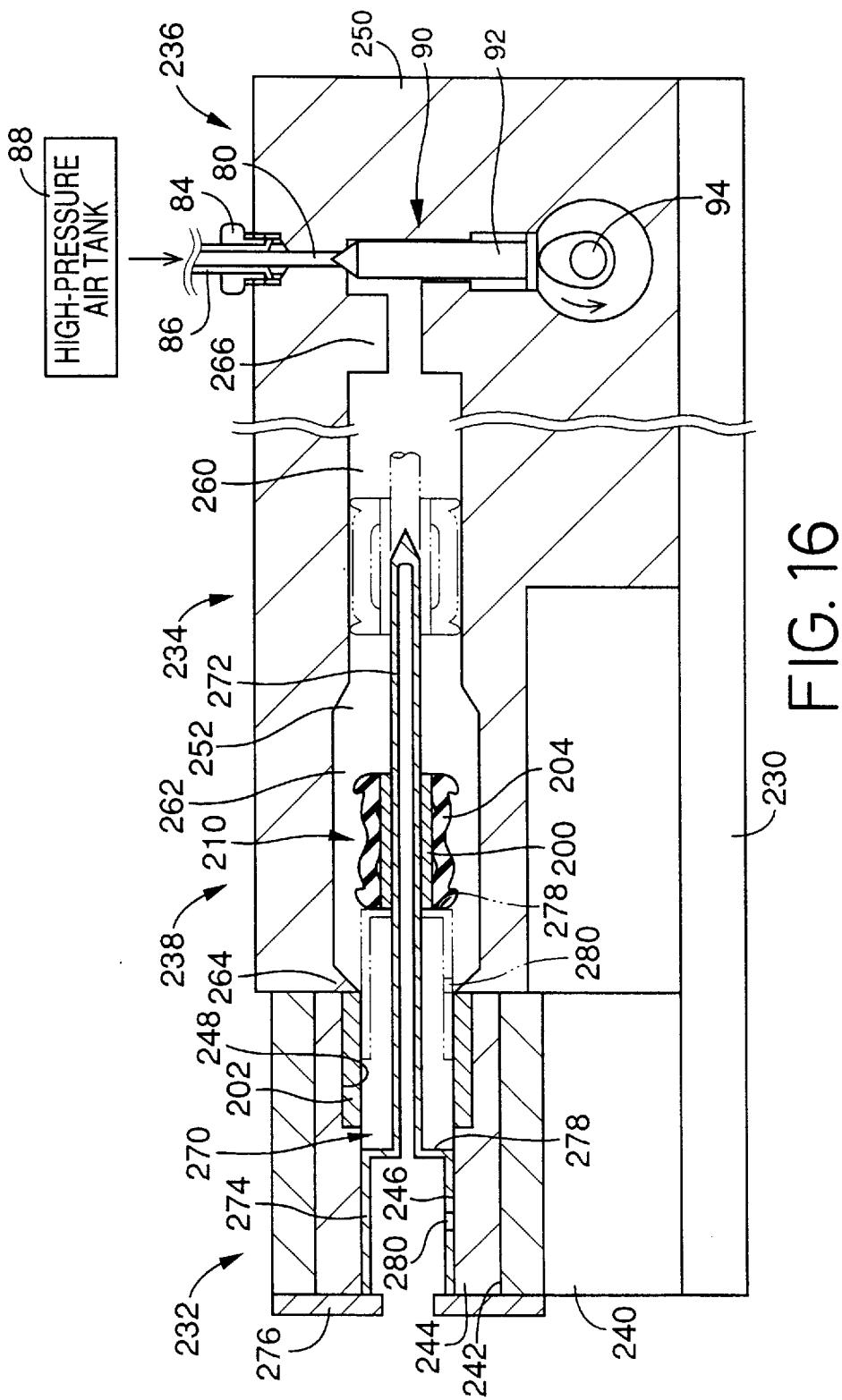
FIG. 16 is an elevational view in cross section showing an assembling method suitable for practicing an interference-fit method according to a sixth embodiment of the invention.

Referring next to FIG. 16, an assembling apparatus suitable for practicing the press-fitting method according to the sixth preferred embodiment of the invention will be described.

The present assembling apparatus is adapted to produce an assembly of an inner sleeve 200 and an outer sleeve 202 both made of a steel material, and a rubber bushing 204 interposed therebetween in coaxial relationship with the sleeves 200, 202, as shown in FIG. 17. Described more specifically, the assembly 200, 202, 204 is produced by forcing an inner member 210 (inner sleeve 200 with the rubber bushing 204 bonded to its outer circumferential surface) into a bore 206 of the outer sleeve 200. Thus, the assembly to be produced consists of a rigid first part in the form of the outer sleeve 202, and a second part in the form of the inner member 210 having an elastic portion in the form of the rubber bushing 204. For example, this assembly 200, 202, 204 is used as a damper for elastically connecting two members of a vehicle suspension system in a vibration damping manner. The apparatus is arranged to drive the inner member 210 toward the outer sleeve 202 for achieving an interference or force fit between the rubber bushing 204 and the outer sleeve 202.

To permit smooth movement of the inner member 210 with the rubber bushing 204 into the bore 206 of the outer sleeve 202, it is desirable to elastically radially compress the rubber bushing 204 prior to the press-fitting operation. To this end, the present embodiment is arranged such that an external pressure is applied to the contacting or mating surface of the rubber bushing 204 immediately before the rubber bushing 204 is forced into the bore 206. For facilitating the radial compression and diameter reduction of the rubber bushing 204 by application of the external pressure, the rubber bushing 204 is given a specially designed shape. That is, the shape of the rubber bushing 204 is determined so that only the end portions of the inner circumferential surface of the rubber bushing 204 are held in close contact with the outer circumferential surface of the inner sleeve 200. In other words, an annular air void 212 is formed between the axially intermediate portion of the inner circumferential surface of the rubber bushing 204 and the corresponding portion of the outer circumferential surface of the inner sleeve 200, so that the rubber bushing 204 is not in close contact with the inner sleeve 200 over its entire inner circumferential surface. In this arrangement, a compressive force acting on the rubber bushing 204 in the radially inward direction based on the external pressure applied thereto causes the axially intermediate portion of the rubber bushing 204 to be elastically deformed radially inwardly so as to fill the annular air void 212. As a result, flanges 214 formed at the axially opposite end portions of the rubber bushing 204 are elastically deformed axially inwardly of the rubber bushing 204, as indicated in FIG. 16, whereby the overall diameter of the rubber bushing 204 is reduced. Thus, the rubber bushing 204 is elastically deformed by application of the external pressure in the radially inward direction, namely, in a direction that permits the amount of clearance between the inner member 210 and the outer sleeve 202. In FIG. 16, the cross sectional shape of the rubber bushing 204 before application of the external pressure is indicated in two-dot chain line, and that after application of the external pressure is indicated in solid line. In the produced assembly 210, 202 shown in FIG. 17, the flanges 214 indicated above are located outside the outer sleeve 202.

The assembling apparatus of FIG. 16 is equipped with a base 230, a first holder device 232, a second holder device 234 and an accelerating device 236, as in the first embodiment of FIG. 1, and is further equipped with a compressing device 238 not provided in the first embodiment.

The first holder device 232 includes a frame 240 fixed on the base 230, and a holder member in the form of a cylindrical member 244 which is slidably and removably received in a through-hole 242 formed through the frame 240. The cylindrical member 244 has a stepped bore having a small-diameter hole 246 and a large-diameter hole 248 which are coaxial with each other. The outer sleeve 202 is received in the large-diameter hole 248 such that the bore of the outer sleeve 202 has the same diameter as and is coaxial with the small-diameter hole 246.

The second holder device 234 includes a frame 250 fixed on the base 230. The frame 250 has a guide passage 252 which is formed coaxially with the outer sleeve 202 held by the first holder device 232. The guide passage 252 has a circular shape in transverse cross section and a stopper bottom wall 266 at one axial end remote from the first holder device 232. The guide passage 252 is a stepped hole consisting of a small-diameter passage 260 and a large-diameter passage 262 which are formed in series. The small-diameter passage 260 is located on the side of the stopper bottom wall 266, while the large-diameter passage 260 is located on the side of the first holder device 232.

The diameter of the small-diameter passage 260 is equal to or slightly smaller or larger than the outside diameter of the inner member 210 of the assembly 202, 210 to be produced. The inner member 210 is substantially air-tightly and slidably received in the small-diameter passage 260, and is thereby guided toward the outer sleeve 202 held by the first holder device 232.

The stopper bottom wall 266, which defines the end of the small-diameter passage 260 remote from the large-diameter passage 262, functions to determine the initial position of the inner member 210.

On the other hand, the large-diameter passage 262 has a diameter larger than the outside diameter of the inner member 210, so that an annular space is provided between the outer circumferential surface of the inner member 210 and the inner circumferential surface of the large-diameter passage 262, when the inner member 210 is located within the large-diameter passage 262. The large-diameter passage 262 has a tapered end portion 264 whose diameter decreases in the direction toward the outer sleeve 202 so that the diameter at the extreme end of the tapered end portion 264 is equal to the inside diameter of the outer sleeve 202. This tapered end portion 264 functions as a varying-diameter portion for facilitating the press-fitting movement of the inner member 210 into the bore of the outer sleeve 202.

Since the diameter of the large-diameter passage 262 is larger than the outside diameter of the inner member 21 (the outside diameter of its rubber bushing 204), an appropriate device is required for axially moving the inner member 210 in the large-diameter passage 262 toward the bore of the outer sleeve 202 held by the first holder device 232. In the present apparatus, a guide piston 270 is provided for guiding the inner member 210 toward the outer sleeve 202.

The guide piston 270 is a stepped piston consisting of a small-diameter piston 272 and a large-diameter piston 274 which are disposed in series. The guide piston 270 is supported by the first holder device 232 such that the large-diameter piston 274 is substantially air-tightly and slidably fitted in the small-diameter hole 246 of the cylindrical member 244. A disk-like stop member 276 is attached to the end of the cylindrical member 244, for preventing removal of the guide piston 270 from the cylindrical member 244. The guide piston 270 is a hollow member having a relatively small weight. The inner member 210 is supported and guided by the small-diameter piston 272 such that the inner sleeve 200 of the inner member 21 is substantially air-tightly slidable on the small-diameter piston 272. When the inner member 210 is located within the large-diameter passage 262, the small-diameter piston 272 is also located within the large-diameter passage 262. In this arrangement, the inner member 210 is movable in the large-diameter passage 262 while being guided by the small-diameter piston 272 toward the outer sleeve 202 held by the first holder device 232.

As in the apparatus of FIG. 1, the air passage 80 is formed through the frame 250. The air passage 80 is connected to the high-pressure air tank 88 and is open to the inner end portion of the guide passage 252. The air passage is provided with the needle valve 90 which has the valve body 92 and is operated by the cam 94 provided in the frame 250. In the present embodiment, the air passage 80, high-pressure air tank 88, needle valve 90 and cam 94 cooperate to provide an accelerating device 236 for driving the inner member 210 toward the outer sleeve 202.

An operation of the assembling apparatus of FIG. 16 will be described.

Initially, the inner member 210 is positioned within the small-diameter passage 260, and the guide piston 270 is positioned such that an end face 278 of the large-diameter piston 274 is located within the large-diameter passage 262, as indicated by two-dot chain line in FIG. 16, so that the inner member 210 comes into abutting contact with the end face 278 before the inner member 210 reaches the outer sleeve 202. A significance of this arrangement will become apparent from the following description.

The needle valve 90 is rapidly opened in this condition, and the compressed air is delivered from the air tank 88 into the small-diameter passage 260 through the air passage 80. Since the rubber bushing 204 of the inner member 210 is in substantially air-tight contact with the inner circumferential surface of the small-diameter passage 260, the inner member 210 is advanced by the compressed air, at a high speed through the small-diameter passage 260 toward the large-diameter passage 262.

In an initial phase of the advancing movement of the inner member 210 through the small-diameter passage 260, the inner member 210 is not guided by the small-diameter piston 272 of the guide piston 270 which is initially placed in the position indicated by two-dot chain line in FIG. 16. In this phase, the space in front of the inner member 210 communicates with the rear end portion of the small-diameter passage 260 through the bore of the inner sleeve 200 of the inner member 210. Consequently, the air is discharged from the above-indicated space into the rear end portion of the passage 260 through the bore of the inner sleeve 200 as the inner member 210 is advanced by the compressed air delivered from the tank 88. Thus, the advancing movement of the inner member 210 toward the outer sleeve 202 is not prevented or disturbed by the compression of the air in the above-indicated space.

In an intermediate phase of the advancing movement of the inner member 210, the inner member 210 is guided by and moved relative to the small-diameter piston 272 of the guide piston 270, toward the large-diameter piston 274, without a contact of the inner member 210 with the inner surface of the large-diameter passage 262. In this sense, the piston 270 functions as a support mechanism for supporting the inner member 210 without a contact thereof with the inner surface of the large-diameter passage 262. In this intermediate phase initiated by the engagement of the inner member 210 with the small-diameter piston 272, the air cannot be discharged from the space in front of the inner member 210 into the space behind the inner member 210 through the bore of the inner sleeve 200. In the light of this fact, the large-diameter piston 274 has an air breather hole 280 formed therethrough for communication between the large-diameter passage 262 and the space inside the piston 274 which is open to the atmosphere. In this arrangement, the space in front of the inner member 210 is open to the atmosphere through the air breather hole 280, so that the air is discharged from this space to the atmosphere through the air breather hole 280 as the inner member 210 is advanced through the large-diameter passage 262. Accordingly, the advancing movement of the inner member toward the outer sleeve 202 is not disturbed by the compression of the air in the large-diameter passage 262. In the present embodiment, the air breather hole 280 functions as a mechanism for preventing or restricting an increase in the air pressure in the space in front of the inner member 210 during movement of the inner member 210 through the large-diameter passage 262.

A terminal phase of the advancing movement of the inner member 210 is initiated by abutting contact of the inner member 210 with the end face 278 of the large-diameter piston 274 of the piston 270 placed in its initial position indicated by two-dot chain line in FIG. 16. Subsequently, the inner member 210 and the guide piston 270 are advanced as a unit. As a result of the advancing movement of the guide piston 270, the air breather hole 280 formed through the large-diameter piston 274 is closed by the outer sleeve 202, and the air pressure in the large-diameter passage 262 is increased. The inner member 210 which has been accelerated by a kinetic energy given by the compressed air supplied to the small-diameter passage 260 is further advanced through the large-diameter passage 262 at a substantially constant velocity by the kinetic energy. At the same time, the rubber bushing 204 of the inner member 210 moving in the large-diameter passage 262 receives at the entire area of the its outer surface the pressure of the compressed air in the large-diameter passage 262, whereby the rubber bushing 204 is radially inwardly compressed and deformed by the compressed air pressure in the presence of the annular air void 212, which is formed in the axially intermediate portion of the inner member 210 as described above. Thus, the inner member 210 is advanced through the large-diameter passage 262 by the kinetic energy while the rubber bushing 204 is radially inwardly compressed by a compressive force so as to reduce the outside diameter of the inner member 210. The large-diameter passage 262 functions as a high-pressure chamber in which the rubber bushing 204 is radially inwardly compressed by the air pressure higher than the atmospheric pressure.

Subsequently, the inner member 210 is inserted into the bore of the outer sleeve 202 held by the first holder device 232. Since the inner member 210 is inserted into the outer sleeve 202 immediately after the radially inward compression of its rubber bushing 204 by the compressive force, namely, before the elastically compressed or deformed rubber bushing 204 fully recovers its original shape and diameter or before the inner member 210 is freed from the radially inward compression or deformation. Thus, the present sixth embodiment permits the press-fitting of the inner member 210 in the outer sleeve 202, while minimizing damaging of the surface of the rubber bushing 204 by the outer sleeve 202.

In the final portion of the terminal phase of the advancing movement of the inner member 210, this inner member 210 is moved in substantially air-tight contact with the inner circumferential surface of the outer sleeve 202, while at the same time the large-diameter piston 274 of the guide piston 270 is moved in substantially air-tight contact with the inner circumferential surfaces of the outer sleeve 202 and the cylindrical member 244. If the guide piston 270 was held stationary at the position indicated by solid line in FIG. 16, an air-tight space would be formed between the the end face 278 of the large-diameter piston 274 and the front end face of the inner member 210, and the air in this air-tight space would be compressed. In the present embodiment wherein the guide piston 270 or its large-diameter piston 274 is moved with the inner member 210, no such air-tight space is formed in front of the inner member 210, and the advancing movement of the inner member 210 is not disturbed by the compressed air in the air-tight space which would be present if the guide piston 270 was held stationary. Further, the space inside the large-diameter piston 274 is open to the atmosphere, the advancing movement of the guide piston 270 is not disturbed by the air pressure inside the large-diameter piston 274. In the present embodiment, the guide piston 270 slidably movable in the first holder device 232 and the large-diameter piston 274 whose inside space is open to the atmosphere cooperate to provide a mechanism for preventing or restricting an increase in the air pressure in an air-tight space between the large-diameter piston 274 and the inner member 210 in the terminal phase of the advancing movement of the inner member 210.

The fully advanced position of the guide piston 270 is determined by the stop member 276. This stop member 276 is positioned so that the advancing movement of the inner member 210 with the guide piston 270 is terminated when the flange 214 provided at the front end of the rubber bushing 204 has been just exposed from the outer sleeve 202. In other words, the assembly of the inner member 210 and the outer sleeve 202 as shown in FIG. 17 is obtained when the guide piston 270 has been brought into abutting contact with the stop member 270. In this assembly of FIG. 17, the two flanges at the opposite ends of the rubber bushing 204 are both exposed outside the outer sleeve 202.

In the present sixth embodiment, the large-diameter passage 262 functions as a high-pressure chamber, and the compressing device 238 is constituted principally by the portion of the frame defining the large-diameter passage 262, and the high-pressure air tank 88. It will be understood that the high-pressure tank 88 is used not only as part of the accelerating device 236, but also as part of the compressing device 238.

As is apparent from the above explanation, the present embodiment of FIG. 16 is adapted to reduce the outside diameter of the rubber bushing 204 immediately before the inner member 210 is inserted into the outer sleeve 202 for attaining an interference fit, and is therefore effective to minimize the surface damage of the rubber bushing 204 by the outer sleeve 202 and improve the quality of the assembly 210, 202 produced by the assembling apparatus.

It is also noted that the present embodiment adapted to facilitate the insertion of the inner member 210 with the outer rubber bushing 204 into the outer sleeve 202 is effective to reduce the time required for completing the press-fitting operation, as compared with the conventional method which includes a step of inserting the inner member 210 into the outer sleeve 202 by a distance larger than the nominal length of the interference fit, and a step of displacing the inner member 210 in the reverse direction by a suitable distance for releasing the residual compressive stress of the rubber bushing 204.

While the several presently preferred embodiments of this invention have been described by reference to the drawings, it is to be understood that the present invention may be embodied with various changes, modifications and improvements, which may occur to those skilled in the art, without departing from the spirit and scope of the invention defined in the following claims.

What is claimed is:

1. A method of effecting an interference fit of two parts, wherein one of said two parts has a bore and the other part has a portion for said interference fit with said bore, said portion having a diameter larger than that of said bore before said interference fit, and wherein at least one of the two parts is accelerated toward the other in a direction that permits said interference fit, before said two parts contact with each other, to give said at least one part a kinetic energy, for thereby achieving said interference fit of said two parts.

2. A method according to claim 1, wherein said kinetic energy is given to said at least one part by applying a pressure of a pressurized fluid to said at least one part.

3. A method according to claim 2, wherein said at least one part is moved toward the other at a substantially constant velocity after said at least one part is given said kinetic energy by acceleration thereof and before said two parts contact each other and initiate a relative movement thereof to achieve said interference fit.

4. A method according to claim 3, wherein said at least one part is guided by a guide passage, and acceleration of said at least one part by said kinetic energy is terminated and said at least one part is moved at said substantially constant velocity after a space formed behind each of said at least one part in said guide passage has been exposed to an ambient space after said at least one part is given said kinetic energy and before said two parts initiate said relative movement to achieve said interference fit.

5. A method according to claim 2, wherein an increase in the pressure of said pressurized fluid in a space in front of each of said at least one part during movement thereof by said kinetic energy is restricted.

6. A method according to claim 5, wherein said at least one part is guided by a guide passage, and said pressure increase is restricted by exposing said space to an ambient space while said at least one part is moved in said guide passage and before said two parts contact each other and initiate a relative movement thereof to achieve said interference fit.

7. A method of effecting an interference fit of two parts, wherein at least one of the two parts is accelerated toward the other in a direction that permits said interference fit to give said at least one part a kinetic energy for thereby achieving said interference fit of said two parts, and wherein said at least one part is guided by a guide passage with a predetermined clearance therebetween, and is supported in said guide passage without a contact with an inner surface of said guide passage.

8. A method according to claim 7, wherein said kinetic energy is given to said at least one part by applying a pressure of a pressurized fluid to said at least one part, and said at least one part is supported in a fluid bearing state in said guide passage without said contact with a supply of said pressurized fluid to said predetermined clearance.

9. A method according to claim 1, wherein said interference fit is achieved by a relative movement of said two parts such that contacting surfaces of said two parts are welded together by friction heat generated at said contacting surfaces during said relative movement.

10. A method according to claim 1, wherein a movement of said at least one part by said kinetic energy is effected under a controlled thermal condition.

11. A method according to claim 10, wherein said kinetic energy is given to said at least one part by applying a pressure of a pressurized gas to said at least one part, and wherein said at least one part is guided by a guide passage, said thermal condition is adjusted such that a temperature of said pressurized gas in said guide passage is held substantially constant.

12. A method of effecting an interference fit of a rigid portion of a first part and an elastic portion of a second part, wherein said second part is accelerated toward said first part and is thereby given a kinetic energy, and during a movement of said second part by said kinetic energy said elastic portion of said second part is subjected to deformation in a direction that permits an increase in an amount of clearance between said first and second part, said deformation being caused by application of a pressure of a pressurized fluid higher than an atmospheric pressure to a surface of said elastic portion of said second part which mates with a corresponding surface of said rigid portion of said first part, said interference fit being achieved by engagement of said rigid and elastic portions with each other before said elastic portion of said second part is freed from said deformation.

13. An apparatus for effecting an interference fit of two parts, wherein one of said two parts has a bore and the other part has a portion for said interference fit with said bore, said portion having a diameter larger than that of said bore before said interference fit, said apparatus comprising:
 a holding device for holding said two parts such that at least one of said two parts is movable toward the other in a direction that permits said interference fit; and
 an accelerating device for accelerating said at least one part held by said holding device, toward the other of said two parts or each other, before said two parts contact with each other, to give said at least one part a kinetic energy, for thereby achieving said interference fit of said two parts.

14. An apparatus according to claim 13, wherein said holding device comprises a first holder device for holding one of said two parts, and a second holder device for holding the other of said two parts such that said other part is movable toward said one part held by said first holder device, and wherein said accelerating device accelerates said other part held by said second holder device, toward said one part held by said first holder device.

15. An apparatus according to claim 13, wherein said accelerating device comprises means for applying a pressure of a pressurized fluid to said at least one part.

16. An apparatus according to claim 13, further comprising an inertial motion mechanism for terminating acceleration of said at least one part so that said at least one part is moved at a substantially constant velocity, after said at least one part is given said kinetic energy by acceleration thereof and before said two parts contact each other and initiate a relative movement thereof to achieve said interference fit.

17. An apparatus according to claim 16, further comprising means for defining a guide passage for guiding said at least one part, and wherein said inertial motion mechanism comprises means for defining a communication hole communicating at one end thereof with an ambient space, said communication hole being located so that said communication hole is communicated at the other end thereof with a space formed behind each of said at least one part in said guide passage after said at least one part is given said kinetic energy and before said two parts initiate said relative movement to achieve said interference fit.

18. An apparatus for effecting an interference fit of two parts, comprising:
 a holding device for holding said two parts such that at least one of said two parts is movable toward the other in a direction that permits said interference fit:
 an accelerating device for accelerating said at least one part held by said holding device, toward the other of said two parts or each other, to give said at least one part a kinetic energy for thereby achieving said interference fit of said two parts;
 means for defining a guide passage for guiding said at least one part with a predetermined clearance therebetween; and
 a support mechanism for supporting said at least one part in said guide passage without a contact with on inner surface of said guide passage.

19. An apparatus according to claim 18, wherein said accelerating device comprises means for applying a pressure of a pressurized fluid to said at least one part to thereby give said kinetic energy to said at least one part, and said support mechanism comprises means for supplying said pressurized fluid to said predetermined clearance to thereby support said at least one part in a fluid bearing state in said guide passage without its contact with said inner surface of said guide passage.

20. An apparatus according to claim 13, further comprising a pressure-increase restricting mechanism for restricting a pressure increase in a space in front of each of said at least one part during movement thereof by said kinetic energy.

21. An apparatus according to claim 20, further comprising means for defining a guide passage for guiding said at least one part, and wherein said pressure-increase restricting mechanism comprises means for defining an air breather hole which communicates at one end thereof with an ambient space and at the other end thereof with said space while said at least one part is moved in said guide passage and before said two parts contact each other and initiate a relative movement thereof to achieve said interference fit.

22. An apparatus according to claim 13, further comprising a welding mechanism for welding together contacting surfaces of said two parts by friction heat generated at said contacting surfaces during said relative movement.

23. An apparatus according to claim 13, further comprising a temperature adjusting mechanism for adjusting a thermal condition under which a movement of said at least one part by said kinetic energy is effected.

24. An apparatus according to claim 23, further comprising means for defining a guide passage for guiding said at least one part, and wherein said accelerating device comprises means for applying a pressure of a pressurized gas to said at least one part to give said kinetic energy thereto, said temperature adjusting mechanism comprises means for holding a temperature of said pressurized gas in said guide passage substantially constant.

25. An apparatus for effecting an interference fit of a rigid portion of a first part and an elastic portion of a second part, comprising:
 a first holder device for holding said first part;
 a second holder device for holding said second part such that said second part is movable toward said first part held by said first holder device;
 an accelerating device for accelerating said second part held by said second holder device, toward said first part held by said first holder device; and
 means for defining a high-pressure chamber in which said second part is moved by said kinetic energy and in which said elastic portion of said second part is subjected to deformation in a direction that permits an increase in an amount of an clearance between said rigid and elastic portions of said first and second parts, said deformation being caused by application of a pressure of a pressurized fluid higher than an atmospheric pressure to a surface of said elastic portion of said second part which mates with a corresponding surface of said rigid portion of said first part, said interference fit being achieved by engagement of said rigid and elastic portions each other before said elastic portion is freed from said deformation.

26. A method according to claim 1, wherein said portion is serrated at an outer circumferential surface thereof.

27. A method according to claim 1, wherein the acceleration of said at least one part is effected without a contact of said at least one part with a mechanical member.

* * * * *